(12) United States Patent
Kim et al.

(10) Patent No.: US 11,541,996 B2
(45) Date of Patent: Jan. 3, 2023

(54) UNMANNED AERIAL VEHICLE

(71) Applicant: SAMSUNG ELECTRONICS CO., LTD., Suwon-si (KR)

(72) Inventors: Jong-Keun Kim, Hwaseong-si (KR); Min-Woo Yoo, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 429 days.

(21) Appl. No.: 16/629,706

(22) PCT Filed: May 11, 2018

(86) PCT No.: PCT/KR2018/005445
§ 371 (c)(1),
(2) Date: Jan. 9, 2020

(87) PCT Pub. No.: WO2019/022354
PCT Pub. Date: Jan. 31, 2019

(65) Prior Publication Data
US 2020/0122828 A1 Apr. 23, 2020

(30) Foreign Application Priority Data
Jul. 28, 2017 (KR) .......................... 10-2017-0096459

(51) Int. Cl.
*B64C 27/82* (2006.01)
*B64C 11/20* (2006.01)
(Continued)

(52) U.S. Cl.
CPC .............. *B64C 27/82* (2013.01); *B64C 11/20* (2013.01); *B64C 27/52* (2013.01); *B64C 27/72* (2013.01);
(Continued)

(58) Field of Classification Search
CPC ......... B64C 27/82; B64C 11/20; B64C 27/52; B64C 27/72; B64C 39/024; B64C 2201/108; B64C 2201/12
See application file for complete search history.

(56) References Cited

U.S. PATENT DOCUMENTS 6,783,327 B1    8/2004  Davis
10,392,104 B1*  8/2019  Urban .................. B64C 39/024
(Continued)

FOREIGN PATENT DOCUMENTS

CN    105173072       12/2015
CN    206332289 U  *  7/2017
(Continued)

OTHER PUBLICATIONS

Notification of Reasons for Rejection dated Jul. 23, 2021 in counterpart Korean Patent Application No. 10-2017-0096459 and English-language translation.
(Continued)

*Primary Examiner* — Justin M Benedik
(74) *Attorney, Agent, or Firm* — Nixon & Vanderhye, P.C.

(57) ABSTRACT

An example unmanned aerial vehicle includes a housing; a wireless communication module; a plurality of propulsion systems; and a navigation circuit. At least one of the plurality of propulsion systems includes a motor; and a propeller assembly rotatably connected to the motor. The propeller assembly comprises: a hub structure including a surface facing away from the motor; a first connecting member including a first post and a second post extending in parallel to and spaced apart from the first post, and the first post and the second post are fixed to the surface and are able to move elastically in a second direction perpendicular to the first direction; a first blade detachably coupled to the first connecting member and comprising an opening to which the
(Continued)

first post and the second post are coupled; and a cap detachably coupled to the top of the first connecting member.

14 Claims, 20 Drawing Sheets

(51) Int. Cl.
    *B64C 27/52*     (2006.01)
    *B64C 27/72*     (2006.01)
    *B64C 39/02*     (2006.01)

(52) U.S. Cl.
    CPC ...... *B64C 39/024* (2013.01); *B64C 2201/108* (2013.01); *B64C 2201/12* (2013.01)

(56) References Cited

U.S. PATENT DOCUMENTS

| | | | |
|---|---|---|---|
| 2013/0280075 | A1 | 10/2013 | Kuntze-Fechner et al. |
| 2014/0356174 | A1* | 12/2014 | Wang ................. B64C 11/02 |
| | | | 416/204 R |
| 2015/0129711 | A1 | 5/2015 | Caubel |
| 2016/0001879 | A1* | 1/2016 | Johannesson ........... B64C 27/50 |
| | | | 416/142 |
| 2017/0001721 | A1* | 1/2017 | Saika .................... B64C 39/024 |
| 2017/0043870 | A1 | 2/2017 | Wu et al. |

FOREIGN PATENT DOCUMENTS

| | | |
|---|---|---|
| KR | 20-1995-0022494 | 8/1995 |
| KR | 10-1527544 | 6/2015 |

OTHER PUBLICATIONS

International Search Report for PCT/KR2018/005445 dated Aug. 17, 2018, 4 pages.

Written Opinion of the ISA for PCT/KR2018/005445 dated Aug. 17, 2018, 5 pages.

\* cited by examiner

UNMANNED AERIAL VEHICLE

CROSS-REFERENCE TO RELATED APPLICATION(S)

This application is a U.S. National Stage application under 35 U. S. C. § 371 of an International application filed on May 11, 2018 and assigned application number PCT/KR2018/005445, which claimed the priority of a Korean patent application filed on Jul. 28, 2017 in the Korean Intellectual Property Office and assigned Serial number 10-2017-0096459, the entire disclosure of which is hereby incorporated by reference.

BACKGROUND

1. Field

Various embodiments of the disclosure relate to an aerial vehicle, for example, an unmanned aerial vehicle.

2. Description of the Related Art

In general, an Unmanned Aerial Vehicle (UAV) means an aerial vehicle that flies by radio wave guidance without a person riding thereon, or an aerial vehicle that autonomously flies by recognizing and determining a surrounding environment (an obstacle or an airway) according to a previously input program or autonomously. The unmanned aerial vehicle may be called a "drone" in the sense of "bees humming", and in some cases, "UVA" may be interpreted as an abbreviation for "Uninhabited Aerial Vehicle", emphasizing the fact that there is a pilot who remotely controls the aerial vehicle from the ground without a person riding therein.

When an unmanned aerial vehicle is equipped with an optical sensor, an infrared sensor, a radar sensor, or the like, the unmanned aerial vehicle may be used for military purposes such as surveillance, reconnaissance, precision attack weapon guidance, and communication/information relay. The usage of unmanned aerial vehicles is expanding to the private sector in fields such as disaster monitoring, disaster prevention, monitoring of geographic and environmental changes, research and development, image capture, distribution, and communication. Furthermore, the fields of application of unmanned aerial vehicles are diversifying. For example, in addition to commercial drones, helicopter-shaped leisure drones including a plurality of rotors or propellers are commercially available.

Depending on the configuration of blades used in an unmanned aerial vehicle and the hub connecting the blades, the propeller may be classified into a fixed propeller and a foldable propeller. For example, in order to improve portability during storage and movement, an unmanned aerial vehicle may adopt a foldable propeller structure, in which, during flight, the propeller is unfolded and used, and during storage, the propeller is folded so as to reduce the volume thereof.

SUMMARY

When a hub and a propeller are provided in a configuration that cannot be disassembled through press-fitting, bonding, or the like in a foldable unmanned aerial vehicle, economic and resource waste may occur due to replacement of all the components when some components are damaged.

When a foldable unmanned aerial vehicle is provided in a configuration that can be disassembled using screws, bolts, nuts, or the like, a separate tool may be required for fastening and/or disassembly for replacing a blade. In addition, when fixing by fastening is not properly followed, the fastening may easily be loosened by the force and vibration acting when the blade rotates. In addition, when screws are repeatedly tightened, the threads provided on the hub may be damaged by the repeated forces and screw-fastening directions (an inclined direction rather than a perpendicular direction), so that the screws may spin with no traction.

Various embodiments of the disclosure aim to provide an unmanned aerial vehicle having a foldable propeller.

According to various embodiments of the disclosure, an unmanned aerial vehicle may include: a housing; a wireless communication module located inside the housing or connected thereto, and configured to perform wireless communication with an external controller; a plurality of propulsion systems connected to the housing or at least partially mounted in the housing; and a navigation circuit configured to control the propulsion systems.

At least one of the plurality of propulsion systems may include a motor controlled by the navigation circuit, and a propeller assembly rotatably connected to the motor.

The assembly may include: a hub structure configured to be rotated by the motor, the hub structure including a surface facing away from the motor; a first connection member protruding from the surface in a first direction perpendicular to the surface, the first connection member including a first post and a second post extending parallel to the first post and spaced apart from the first post, the first post and the second post being elastically movable in a second direction perpendicular to the first direction in the state of being fixed to the surface; a first blade detachably coupled to the first connection member, the first blade including an opening to which the first post and the second post are coupled; and a cap detachably coupled to an upper portion of the first connection member.

According to various embodiments of the disclosure, in an unmanned aerial vehicle including a propeller assembly, the propeller assembly may include: a hub structure disposed to surround at least a portion of a motor and configured to rotate depending on the operation of the motor; a handle structure disposed on one surface of the hub structure and including at least one connection member protruding in a first direction perpendicular to the one surface; at least one blade including a rotation hole detachably coupled to the at least one connection member, the blade being configured to rotate in response to rotation of the handle structure; an elastic member disposed inside the hub structure and configured to provide an elastic force inside the handle structure; and a cap detachably coupled to an upper end of the at least one connection member.

With an unmanned aerial vehicle according to various embodiments of the disclosure, it is possible to provide an unmanned aerial vehicle having a foldable propeller so as to be easy to move or store.

With an unmanned aerial vehicle according to various embodiments of the disclosure, it is possible to provide a structure in which, when one blade is fractured or damaged, the damaged blade alone may be replaced, rather than replacing all of the components.

DETAILED DESCRIPTION

Figure 1:
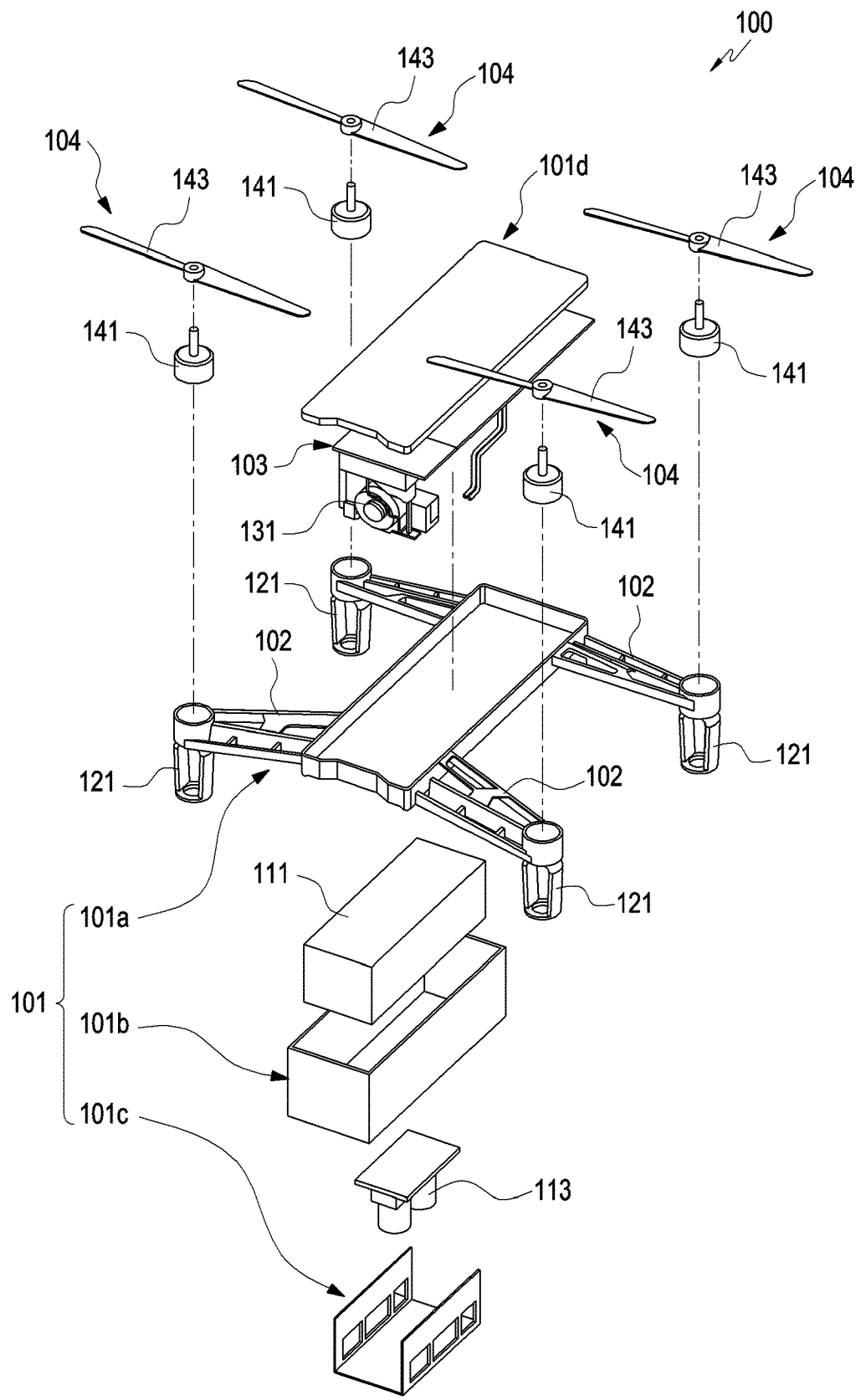
FIG. 1 is an exploded perspective view illustrating an unmanned aerial vehicle 100 according to various embodiments of the disclosure.

Hereinafter, various embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless the context clearly indicates otherwise. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smartphone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the disclosure is not limited to the aforementioned devices, and may include a new electronic device according to the development of technology.

Hereinafter, an electronic device according to various embodiments will be described with reference to the accompanying drawings. In the disclosure, the term "user" may indicate a person using an electronic device or a device (e.g., an artificial intelligence electronic device) using an electronic device.

Figure 2:
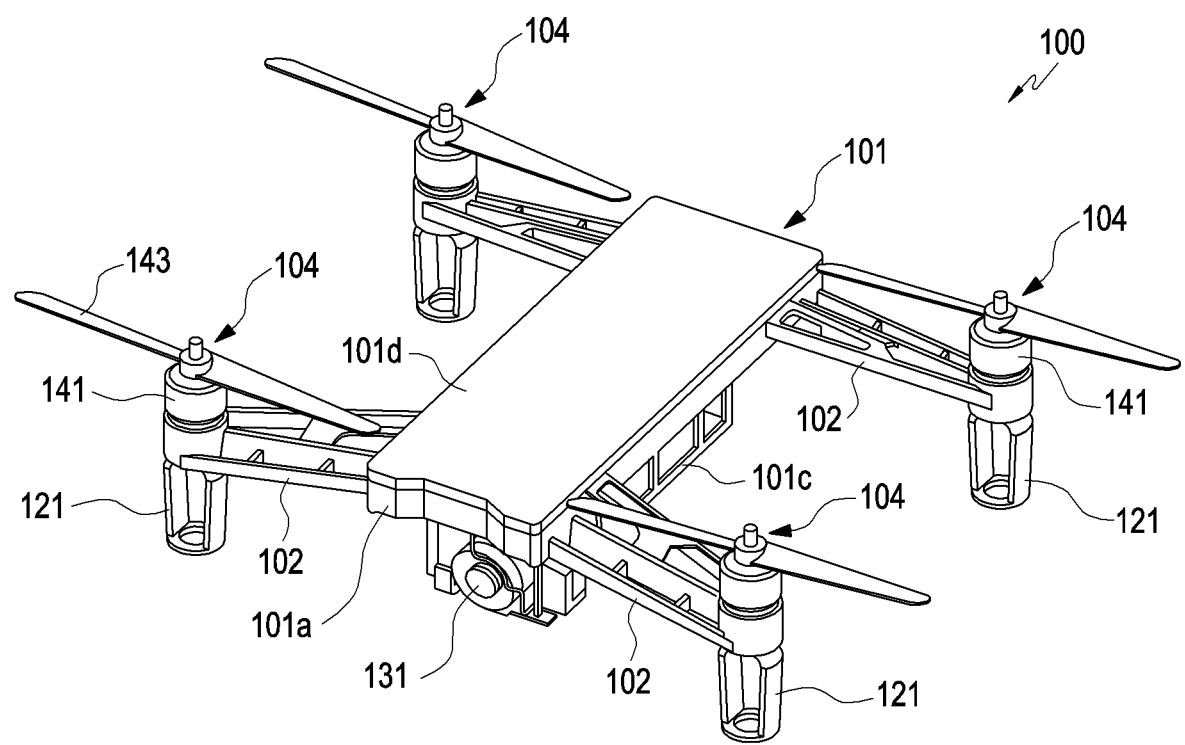
FIG. 2 is a perspective view illustrating the unmanned aerial vehicle 100 according to various embodiments of the disclosure.
Figure 3:
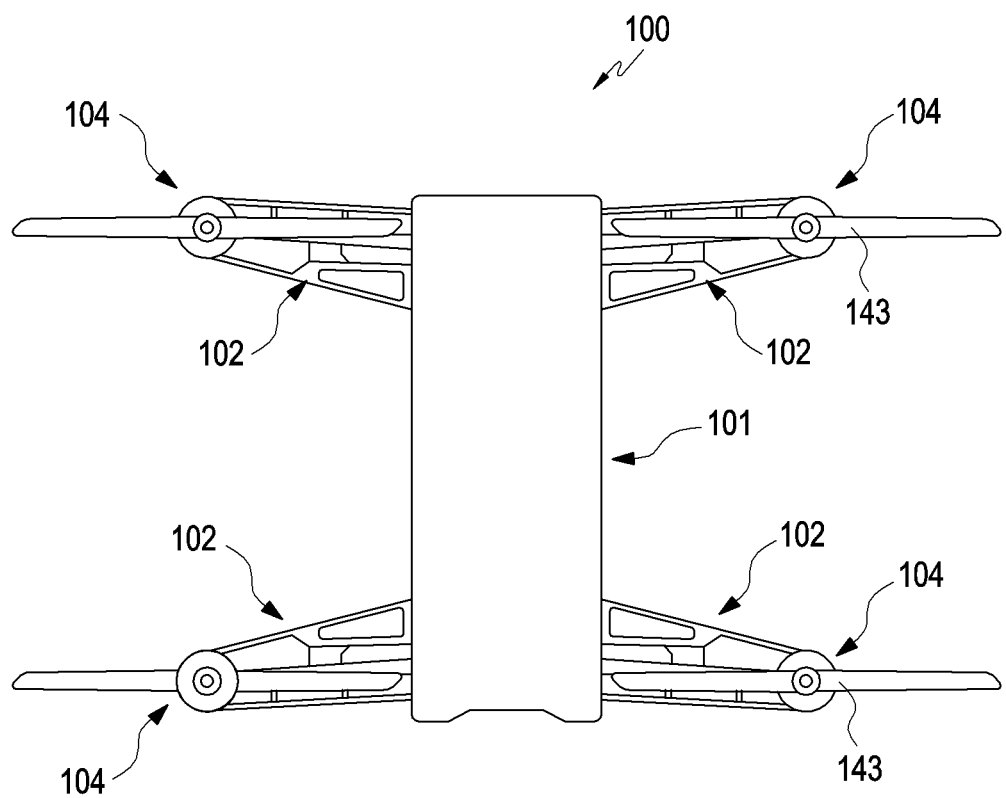
FIG. 3 is a plan view illustrating the unmanned aerial vehicle 100 according to various embodiments of the disclosure.
Figure 4:
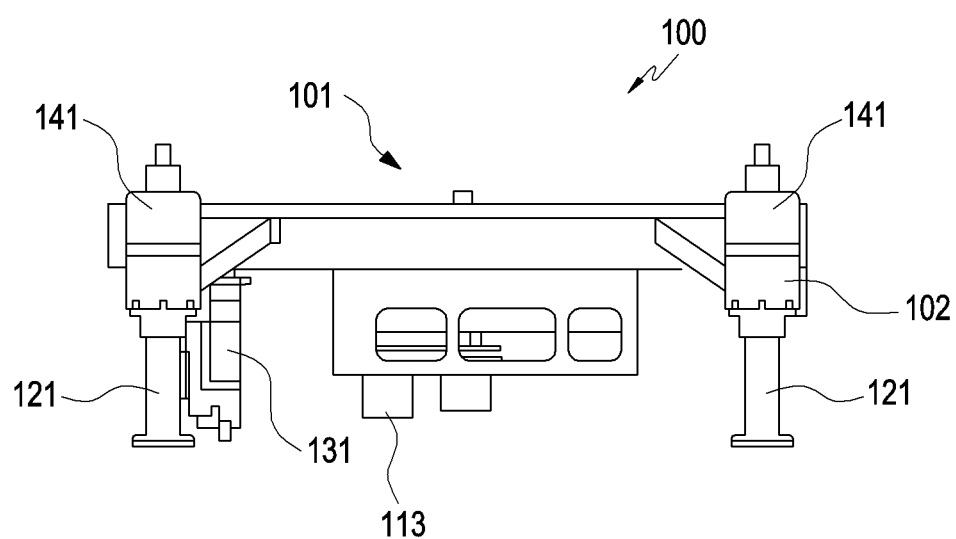
FIG. 4 is a side view illustrating the unmanned aerial vehicle 100 according to various embodiments of the disclosure.
Figure 5:
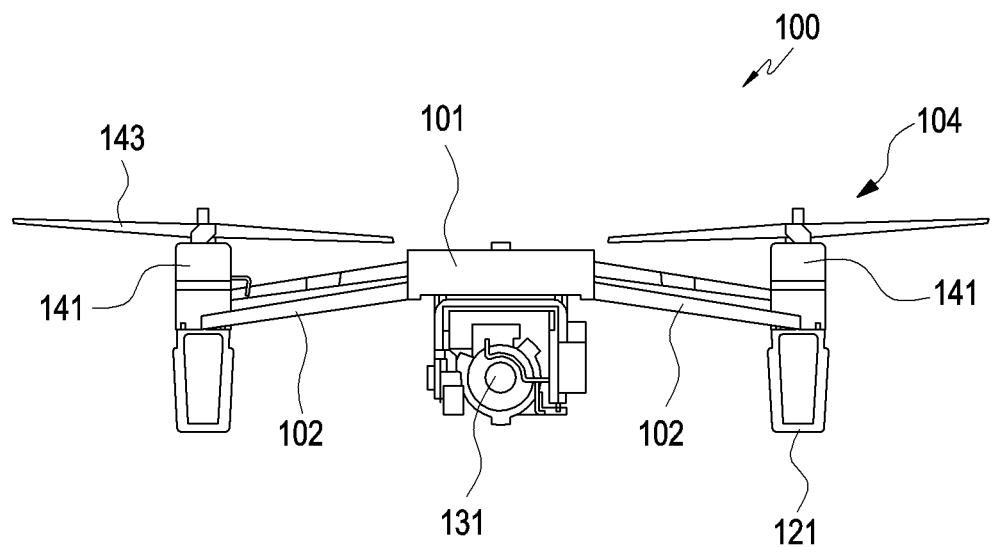
FIG. 5 is a front view illustrating the unmanned aerial vehicle 100 according to various embodiments of the disclosure.

FIG. 1 is an exploded perspective view illustrating an unmanned aerial vehicle 100 according to various embodiments of the disclosure. FIG. 2 is a perspective view illustrating the unmanned aerial vehicle 100 according to various embodiments of the disclosure. FIG. 3 is a plan view illustrating the unmanned aerial vehicle 100 according to various embodiments of the disclosure. FIG. 4 is a side view illustrating the unmanned aerial vehicle 100 according to various embodiments of the disclosure. FIG. 5 is a front view illustrating the unmanned aerial vehicle 100 according to various embodiments of the disclosure.

According to various embodiments of the disclosure, an unmanned aerial vehicle (e.g., the unmanned aerial vehicle 100 in FIGS. 1 to 5) may be connected to a remote controller (RC) in a wireless manner and may be controlled via the remote controller. According to an embodiment, the remote controller may include an electronic device, such as a mobile communication terminal or a tablet PC. For example, the remote controller may control a flight direction, a flight speed, an altitude, or the like by controlling the yaw, pitch, and roll of the unmanned aerial vehicle 100, the output (e.g., the throttle) of a thrust generating device, or the like through a lever or stick that is capable of four-way movement or a virtual lever implemented on a touch pad of an electronic device. According to various embodiments, the unmanned aerial vehicle 100 may include a camera device (e.g., a gimbal camera), and the remote controller (e.g., a smartphone) that controls the unmanned aerial vehicle 100 may perform flight control and camera control at the same time.

According to various embodiments, the electronic device that functions as the remote controller may output an image transmitted from the unmanned aerial vehicle 100 as a preview screen, and a pilot may capture a video image or a still picture while viewing the preview screen. In another embodiment, when the unmanned aerial vehicle 100 is controlled through a touch pad of the electronic device that functions as the remote controller, a remote controller for flight control and a remote controller for camera control may be provided in different respective regions of the touch pad. In still another embodiment, an image captured while the unmanned aerial vehicle 100 is flying may be output in real time through the electronic device that functions as the remote controller, and the pilot who operates the electronic device may control the altitude, the flight speed/direction of the unmanned aerial vehicle 100, or the like on the basis of the output image. In still another embodiment, the pilot may wear a virtual-reality (VR) device to control the unmanned aerial vehicle 100 from the point of view of the unmanned aerial vehicle 100. In still another embodiment, the unmanned aerial vehicle 100 may recognize and determine surrounding environments (an obstacle, an airway, etc.) according to a previously input program, by tracking a designated object, or autonomously in order to fly or capture an image.

Referring to FIGS. 1 to 5, according to various embodiments of the disclosure, the unmanned aerial vehicle 100 may include a housing 101, a frame(s) 102, and a thrust generating device 104.

According to various embodiments, the housing 101 may include a first housing 101a, a second housing 101b, a third housing 101c, and a cover member 101d, and may be equipped with or accommodate a main circuit board 103, a battery 111, various sensor modules 113, a camera device 131, or the like. In an embodiment, the first housing 101a may form and provide a main framework of the unmanned aerial vehicle 100, and may accommodate the main circuit board 103. The camera device (e.g., a gimbal camera 131) may be mounted on the main circuit board 103 such that the gimbal camera 131 protrudes to the lower side of the first housing 101a and is partially exposed to the outside. The gimbal camera 131 may capture an image while maintaining a constant posture or orientation without being shaken even if the unmanned aerial vehicle 100 is rocked due to vibration according to the operation of the thrust generating device 104 or the flow of surrounding fluid.

According to various embodiments, the cover member 101d may be coupled to the top surface of the first housing 101a to conceal and protect the main circuit board 103 accommodated in the first housing 101a. In still another embodiment, the second housing 101b may be coupled to the bottom surface of the first housing 101a in the state in which the second housing 101b accommodates the battery 111. In some embodiments, the battery 111 may be provided to be replaceable. For example, in consideration of the estimated flight time, distance, weight of the unmanned aerial vehicle 100, and the like, the battery 111 may be replaced with another battery that has a larger or smaller power supply capacity. In still another embodiment, the third housing 101c may be coupled to the bottom surface of the first housing 101a in the state in which the sensor module 113 is mounted thereon. For example, the third housing 101c may be coupled to the first housing 101a in the state in which the third housing 101c wraps at least a portion of the second housing 101b.

According to various embodiments, the sensor module 113 includes a gyro sensor, an ultrasonic sensor, or the like so as to be capable of detecting a physical amount or a flight environment (e.g., an obstacle) required for posture control of the unmanned aerial vehicle 100. According to various embodiments, depending on the operation purpose or intention of the unmanned aerial vehicle 100, the third housing 101c and/or the sensor module 113 may not be mounted on the first housing 101a. For example, the sensor module 113 may include an optical flow sensor. However, when the optical flow sensor is not absolutely needed in operating the unmanned aerial vehicle 100, the optical flow sensor and/or the third housing 103c may be removed in order to reduce the weight of the unmanned aerial vehicle 100.

According to various embodiments, the frames 102 are provided to mount the thrust generating device 104 thereon, and each of the frames may extend laterally from the housing 101 (e.g., the first housing 101a). According to the designed specification of the unmanned aerial vehicle 100, an appropriate number of frames 102 may be provided. For example, a structure that is typically provided with four frames 102 is exemplified in describing a specific embodiment of the disclosure. However, in manufacturing an unmanned aerial vehicle in practice, a larger or smaller number of frames may be provided depending on the size or weight of the unmanned aerial vehicle or the performance of the thrust generating device with which the unmanned aerial vehicle is equipped. In an embodiment, the frames 102 may be symmetrically arranged or formed with respect to the center of the unmanned aerial vehicle 100 (for example, the center of gravity of the unmanned aerial vehicle 100 or the central axis of the unmanned aerial vehicle 100 in the length or width direction). In another embodiment, the frames 102 may be asymmetrically arranged depending on the specification (e.g., propelling performance) of the thrust generating device mounted on each of the frames 102.

According to various embodiments, each of the frames 102 may further include a landing gear 121. The landing gear 121 may hold the sensor module 113 or the like such that the sensor module 113 or the like does not come in contact with the ground even in the state in which the unmanned aerial vehicle 100 lands on the ground. According to an embodiment, the landing gear 121 extends downwards from the bottom surfaces of the frames 102 to be positioned around the second housing 101b and/or the third housing 101c.

According to various embodiments, the thrust generating device 104 is provided to generate a flight-driving force (e.g., thrust or lift) of the unmanned aerial vehicle 100 and may include a plurality of driving motors and propellers 143 mounted on respective driving motors 141. In an embodiment, each of the driving motors 141 may be mounted on one of the frames 102. For example, each of the driving motors 141 may be mounted on a portion (e.g., an end portion) of one of the frames 102. The rotation region (rotation plane) of the propellers 143 may be substantially parallel to the ground, and each of the propellers 143 may generate a force acting in the vertical direction (e.g., the direction opposite gravity). In some embodiments, because the thrust generating devices 141 are mounted on the portions (e.g., end portions) of the frames 102, interference with other structures may be suppressed in the region below the rotation plane of the propellers 143. For example, because the thrust generating devices 104 are mounted on the portions (e.g., end portions) of the frames 102, air flow may be smoothened in the region below the rotation plane of the propellers 143 and the performance of the propellers 143 may be stabilized.

According to various embodiments of the disclosure, the unmanned aerial vehicle 100 may include a plurality of thrust generating devices 104, which may generate respective forces with different magnitudes. When the thrust generating devices 104 generate respective forces with different magnitudes, the resultant force of the forces of the thrust generating devices 104 may act on the unmanned aerial vehicle 100 in an inclined direction with respect to the ground or the direction of gravity. For example, the resultant force of the forces of the thrust generating devices 104 may act on the unmanned aerial vehicle 100 as a force (lift) that acts in the direction opposite the direction of gravity and a force (thrust) that acts in a direction perpendicular to the direction of gravity (e.g., a direction parallel to the ground). The force that acts in the direction opposite the direction of gravity is capable of controlling the altitude of the unmanned aerial vehicle 100 or maintaining a hovering flight state of the unmanned aerial vehicle 100, and the force that acts in the direction perpendicular to the direction of gravity in the take-off state enables the unmanned aerial vehicle 100 to advance in a predetermined direction. It is noted that, for example, the thrust generating devices 104 are capable of generating lift and thrust acting on the unmanned aerial vehicle 100, and are referred to as "thrust generating device" in a specific embodiment of the disclosure for conciseness of description. In some embodiments, depending on the resultant force of the forces generated by the thrust generating devices 104, the unmanned aerial vehicle 100 is capable of adjusting an image-capturing direction of the gimbal camera 131 while being positioned at an incline with respect to the direction of gravity (e.g., adjusting a pitch angle or a rolling angle) or turning (e.g., yawing).

In the above-described embodiments, a specific example of a camera device (e.g., the gimbal camera 113) or the sensor module 113 is represented, but the disclosure is not necessarily limited thereto. According to various embodiments of the disclosure, the gimbal camera 131 or the sensor module 113 of the unmanned aerial vehicle 100 may be replaced with various other devices or sensors depending on the operation purpose or environment of the unmanned aerial vehicle 100. For example, when the unmanned aerial vehicle 100 is operated at night, the gimbal camera 131 may be equipped with an image sensor that is capable of detecting infrared rays. In another embodiment, when the unmanned aerial vehicle 100 is operated in order to monitor environmental pollution, the sensor module 113 may include a sensor that detects the density of a chemical substance, fine dust, radioactivity, or the like in the air.

Figure 6:
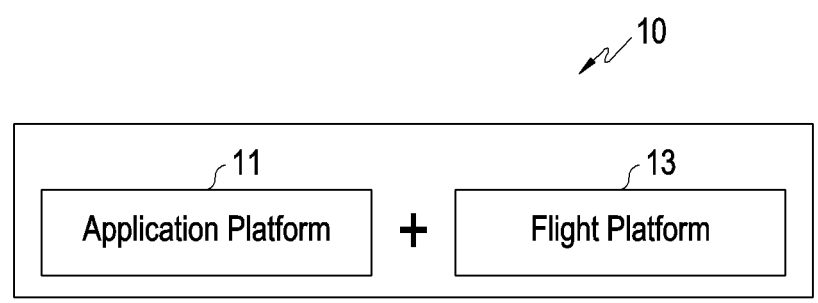
FIG. 6 is a view illustrating platforms of an unmanned aerial vehicle 10 according to various embodiments of the disclosure.

FIG. 6 is a view illustrating platforms of an unmanned aerial vehicle 10 according to various embodiments of the disclosure.

Referring to FIG. 6, the unmanned aerial vehicle 10 (e.g., the unmanned aerial vehicle 100 in FIG. 1) may include an application platform 11 and a flight platform 13. The application platform 11 may be interlocked in a wireless manner with another electronic device (e.g., a remote controller or an electronic device that is equipped with a remote controller function (e.g., a smartphone)) in order to process a signal for driving the unmanned aerial vehicle 10, providing a service, or the like. The flight platform 13 may perform control for the overall flight of the unmanned aerial vehicle 10 by including a flight control algorithm and/or a navigation algorithm.

Figure 7:
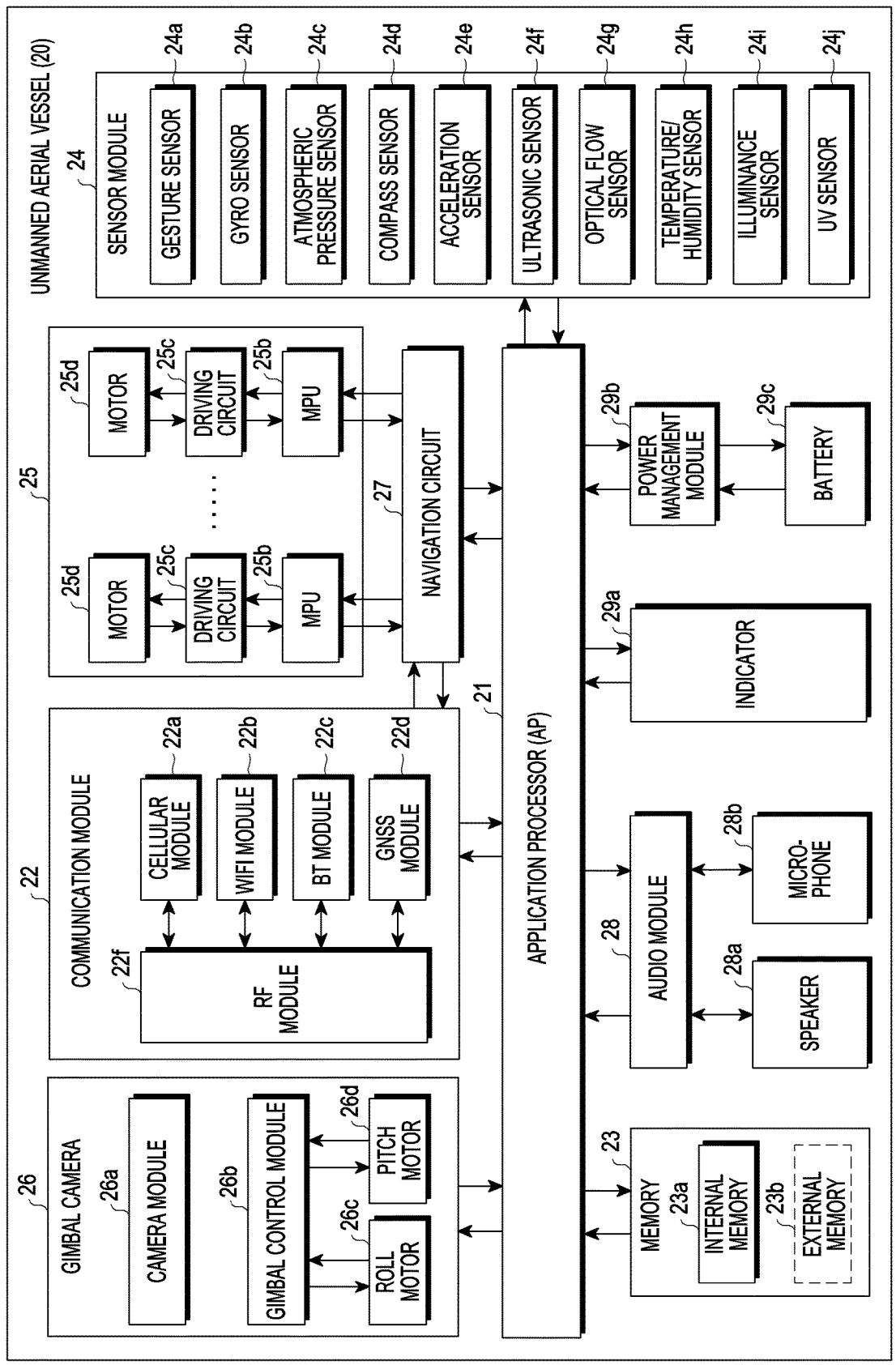
FIG. 7 is a block diagram illustrating an unmanned aerial vehicle 20 according to various embodiments of the disclosure.

FIG. 7 is a block diagram illustrating an unmanned aerial vehicle 20 according to various embodiments of the disclosure.

Referring to FIG. 7, the unmanned aerial vehicle 20 may include all or part of the unmanned aerial vehicle 100 illustrated in FIG. 1 and/or the unmanned aerial vehicle 10 illustrated in FIG. 6. The unmanned aerial vehicle 20 may include at least one application processor 21 (e.g., an AP), a communication module 22, memory 23, a sensor module 24 (e.g., the sensor module 113 of FIG. 1), a thrust generating device 15 (e.g., the thrust generating device 104 of FIG. 1), a gimbal camera 26 (e.g., the camera device of FIG. 1), an audio module 28, an indicator 29a, a power management module 29b, and a battery 29c (e.g., the battery 111 of FIG. 1).

The application processor 21 may drive, for example, an operating system or an application as a part of the application platform 11 of FIG. 6 so as to control a plurality of hardware or software components connected thereto, and may also perform various kinds of data processing and arithmetic operations. The application processor 21 may be implemented as, for example, a system-on-chip (SoC). According to an embodiment, the application processor 21 may further include a graphic processing unit (GPU) and/or an image signal processor. The application processor 21 may include at least some components (e.g., the cellular module 22a) among the components illustrated in FIG. 7. The application processor 21 may load a command or data received from at least one of the other components (e.g., nonvolatile memory) in volatile memory to process the command and data, and may store the resultant data in nonvolatile memory. The application processor 21 may control the thrust generating device 25 and/or the gimbal camera 26 according to a program stored in the communication module 22 and/or the memory 23.

The wireless communication module 22 may be located inside the housing (e.g., the housing 101 of FIG. 1) or may be arranged to be connected to the housing. The wireless communication module 22 may include, for example, a cellular module 22a, a Wi-Fi module 22b, a Bluetooth module 22c, a GNSS module 22d, and an RF module 22f. The cellular module 22a may provide, for example, a voice call, a video call, a message service, or an Internet service via, for example, a communication network. According to an embodiment, the cellular module 22a may perform at least some of the functions that may be provided by the application processor 21. According to an embodiment, the cellular module 22a may include a communication processor (CP). According to some embodiments, at least some (e.g., two or more) of the cellular module 22a, the Wi-Fi module 22b, the Bluetooth module 22c, and the GNSS module 22d may be incorporated in a single integrated chip (IC) or IC package. The RF module 22f may transmit/receive, for example, a communication signal (e.g., an RF signal). The RF module 22f may include a transceiver, a power amp module (PAM), a frequency filter, a low-noise amplifier (LNA), an antenna, or the like. According to another embodiment, at least one of the cellular module 22a, the Wi-Fi module 22b, the Bluetooth module 22c, and the GNSS module 22d may transmit/receive an RF signal via at least one separate RF module.

The memory 23 may include, for example, internal memory 23a or external memory 23b. The internal memory 23a may include at least one of, for example, volatile memory (e.g., DRAM, SRAM, or SDRAM), nonvolatile memory (e.g., one-time programmable ROM (OTPROM), PROM, EPROM, EEPROM, mask ROM, flash ROM, flash memory, a hard drive, and a solid-state drive (SSD)). The external memory 23b may further include a flash drive (e.g., compact flash (CF), secure digital (SD), Micro-SD, Mini-SD, extreme digital (xD), multi-media card (MMC), or memory stick). The external memory 23b may be functionally or physically connected to the unmanned aerial vehicle 20 through various interfaces.

The sensor module 24 may constitute at least a part of, for example, the sensor module 113 of FIG. 1. The sensor module 24 may measure a physical quantity or may sense the operating status of the unmanned aerial vehicle 20, and may then convert the measured or sensed information into an electrical signal. In some embodiments, the physical amount or the like detected through the sensor module 24 may be utilized as information required for the flight control of the unmanned aerial vehicle 20. The sensor module 24 may include at least one of, for example, a gesture sensor 24a, a gyro sensor 24b, an atmospheric pressure sensor 24c, a compass sensor 24d, an acceleration sensor 24e, an ultrasonic sensor 24f, an optical flow sensor 24g, a temperature/humidity sensor 24h, an illuminance sensor 24i, and a UV sensor 24j. Additionally or alternatively, the sensor module 24 may further include a control circuit for controlling, for example, one or more sensors incorporated therein. In some embodiments, the unmanned aerial vehicle 20 may further include a processor configured to control the sensor module 24 as a part of the application processor 21 or separately from the application processor 21 so as to control the sensor module 24 while the application processor 21 is in a sleep state. In another embodiment, the sensor module 24 may measure a physical amount or may sense the operation state of the unmanned aerial vehicle 20 to provide the measured or sensed information to the thrust generating device 25, which may control the flight of the unmanned aerial vehicle 20 on the basis of the provided information. For example, each of the sensor module 24 and the thrust generating device 25 may constitute at least a part of the flight platform 13 of FIG. 6.

The thrust generating device 25 may include, for example, as the thrust generating devices 104 of FIG. 1, a plurality of micro-processor units (MPUs) 25b, a plurality of driving circuits 25c, and a plurality of motors 25d (e.g., the driving motors 141 of FIG. 1).

The navigation circuit unit 27 may generate a signal for controlling the motors 25d on the basis of a control signal provided from the application processor 21, various physical amounts or the like via the sensor module 24, or the like. The micro-processor units (MPUs) 25b and the driving circuits 25c may drive the motors 25d (e.g., rotate the propellers 143 of FIG. 1) in response to a control signal from the navigation circuit unit 27 so as to generate the thrust and/or lift required for the flight of the unmanned aerial vehicle 20.

The gimbal camera 26 may include a camera module 26a, a gimbal control module 26b, a roll motor 26c and/or a pitch motor 26d. The camera module 26a is a device that is capable of capturing, for example, a still image and a video image, and according to one embodiment, the camera module 29a may include at least one image sensor, a lens, an image signal processor (ISP), or a flash (e.g., LED or xenon lamp). When the unmanned aerial vehicle 20 is rocked under the influence of the vibration of the thrust generating devices 25, surrounding air flows, or the like, the gimbal control module 26b allows the camera 26a to capture a steady image while maintaining a predetermined posture or orientation. For example, the gimbal control module 26b is capable of suppressing the shaking of the camera module 26a with respect to a subject by driving the roll motor 26c and/or the pitch motor 26d to vibrate the camera module 26a in response to the vibration of the unmanned aerial vehicle 20, thereby improving the quality of a captured image.

The audio module 28 may bidirectionally convert, for example, sound and electrical signals. The audio module 28 may process sound information input or output through, for example, a speaker 28a or a microphone 28b.

The indicator 29a may indicate a specific status (e.g., a booting status or a charged status) of the unmanned aerial vehicle 20 or a part thereof (e.g., the application processor 21).

The power management module 29b may manage, for example, the electric power of the unmanned aerial vehicle 20. According to an embodiment, the power management module 29a may include a power management integrated circuit (PMIC), a charger IC, or a battery or fuel gauge. The PMIC may be configured as a wired and/or wireless charging type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the remaining charge of the battery 29c, and a voltage, a current, or a temperature during the charging of the battery 29c. The battery 29c may include, for example, a rechargeable battery and/or a solar battery.

Figure 8:
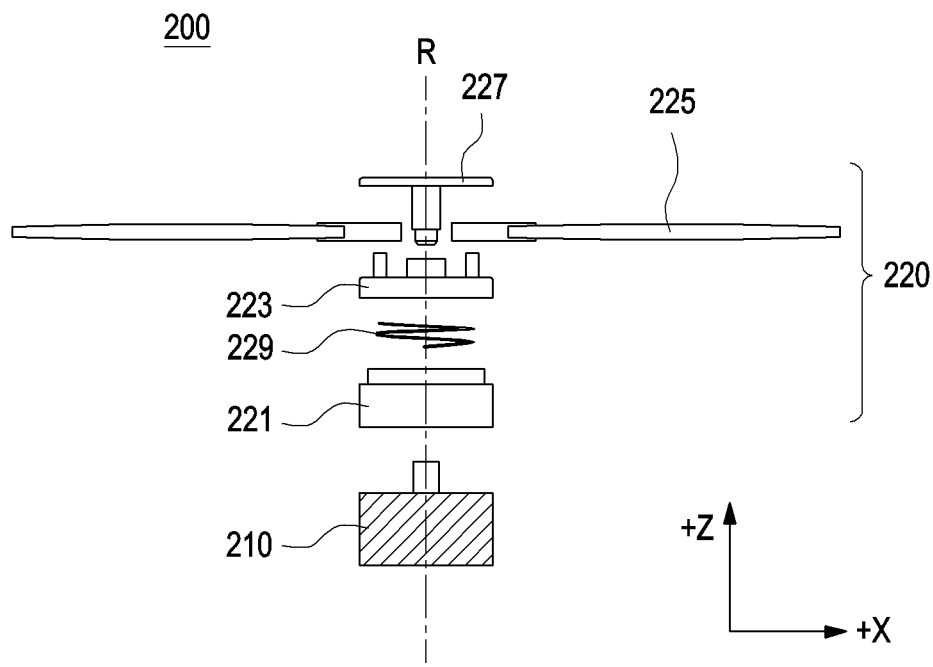
FIG. 8 is a side view illustrating an unmanned aerial vehicle propulsion system 200 according to various embodiments of the disclosure in a disassembled state.
Figure 9:
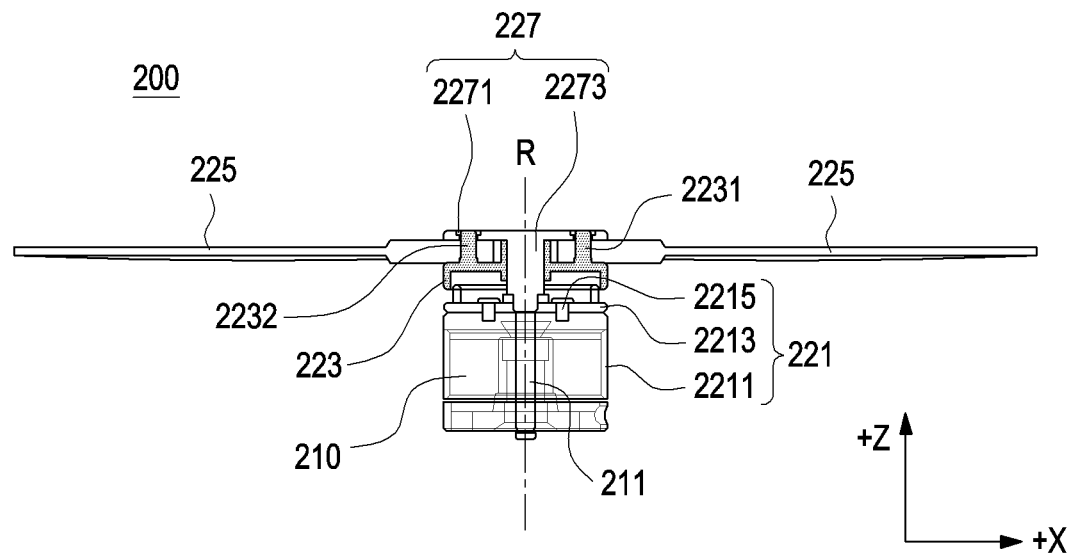
FIG. 9 is a cross-sectional view illustrating the unmanned aerial vehicle propulsion system 200 according to various embodiments of the disclosure.

FIG. 8 is a side view illustrating an unmanned aerial vehicle propulsion system 200 according to various embodiments of the disclosure in a disassembled state. FIG. 9 is a cross-sectional view illustrating the unmanned aerial vehicle propulsion system 200 according to various embodiments of the disclosure.

The propulsion system 200 of FIGS. 8 and 9 may include all or part of, for example, the unmanned aerial vehicle 104 illustrated in FIGS. 1 to 5 and/or the thrust generating device 25 illustrated in FIG. 7.

Referring to FIGS. 8 to 9, the propulsion system 200 (e.g., the thrust generating device 104 of FIG. 1) may include a motor 210 mounted on a frame (e.g., the frame 102 of FIG. 1) and a propeller assembly 220 mounted on the motor 210. The propeller assembly 220 may include a hub structure 221 rotatably connected to the motor 210, a handle structure 223 disposed on one surface of the hub structure 221 oriented in a first (+Z) direction, blades 225 mounted on the handle structure 223, and a cap 227.

According to an embodiment, a plurality of blades 225 are provided to be folded so as to be parallel to each other on one side thereof or to be unfolded to diametrically (or radially) aligned positions of the rotation region (rotation plane) of the propeller assembly 220. According to still another embodiment, the motor 210 may rotate the hub structure 221 by being driven by receiving power and a control signal from, for example, the navigation circuit unit 27 of FIG. 7.

According to various embodiments, the hub structure 221 may include a motor can 2211 that covers at least a portion of the motor 210 and exposes the rotation shaft 211 of the motor 210 through an upper opening, and a bracket 2213 that is fastened to and interlocked with the motor can 2211 to be rotated and is connected to at least a portion of the cap 227. The exposed rotation shaft 211 may be connected to at least a portion of the cap 227 (e.g., the shaft 2273 of the cap 227). The rotation shaft 221 is a shaft extending from the driving motor 210 and may provide a rotation axis R of the propeller system 220 by being rotated by the driving motor 210.

According to an embodiment, an elastic member 229 (e.g., a spring) may be disposed inside the bracket 2213. One surface of the elastic member 229 may be seated inside the bracket 2213, and the other surface of the elastic member 229 may be connected to at least a portion of the lower surface of the handle structure 223 so as to provide an elastic force between the hub structure 221 and the handle structure 223.

According to an embodiment, the hub structure 221 may include screws 2215, and the screws 2215 may be fastened to the inside of the bracket 2213 so as to be arranged in close contact with the outer peripheral surface of the rotation shaft 211. For example, the screws 2215 may fix the motor can 2211 mounted on the bracket 2213. According to an embodiment of the disclosure, the hub structure 221 may include an opening including threads in the central region thereof, and the opening including the threads may be disposed inside the bracket 2213 to be coupled to at least a portion of the cap 227. For example, an outer surface of the end portion of the shaft 2227 of the cap 227 may be formed with threads corresponding to the above-mentioned threads and may be mounted and fixed to the opening in the bracket 2213. As the motor can 2211 rotates, the bracket 2213 connected thereto may rotate, and the cap 227 connected to the bracket 2213 may rotate in conjunction with the motor can 2211.

According to various embodiments, the handle structure 223 may be mounted on a portion (e.g., an end portion) of the hub structure 221 so as to be rotated about the rotation axis R by the rotation shaft 211. The bottom surface of the handle structure 223 may be opened such that a portion of the elastic member 229 may be fixedly inserted therein.

According to an embodiment, the handle structure 223 may include connection members 2231 and 2232, each of which extends from one surface thereof oriented in the first (+Z) direction. For example, the connection members 2231 and 2232 may be disposed at positions spaced apart from the rotation axis R, and each of the connection members 2231 and 2232 may extend from the one surface of the handle structure 223 that is parallel to the rotation axis R.

According to an embodiment, the handle structure 223 may include a first connection member 2231 protruding in a direction perpendicular to the one surface (the first (+Z) direction) and a second connection member 2232 extending parallel to the first connection member 2231 and spaced apart from the first connection member 2231. The first connection member 2231 and the second connection member 2232 may be coupled to the blades 225 in the state of being fixed to the one surface. Each of the first connection member 2231 and the second connection member 2232 may be manufactured to have a substantially cylindrical shape, and the upper ends of the first connection member 2231 and the second connection member 2232 may be formed to have a relatively large radius compared to other regions.

According to an embodiment, at least a portion of each of the connection members 2231 and 2232 may be provided as a means (and/or a structure) for rotatably (or pivotably) mounting the blades 225 on the connection members. For example, one end of each of the blades 225 may be pivotably bound to one of the connection members 2231 and 2232. In pivotably mounting the blades 225 on the connection members, when one of the blades 225 rotates clockwise about the connection member 221, the other blades 225 may rotate counterclockwise such that the blades 225 may rotate toward or away from each other. For example, when one of the blades 225 rotates clockwise, the other is pivoted counterclockwise such that the blades may be aligned parallel to each other on one side thereof, or may be aligned to the positions unfolded with respect to each other (the positions at which the blades 227 are substantially in line with each other).

According to various embodiments, the description "the blades 225 are aligned to the positions at which the blades are substantially in line with each other" may mean that the propeller assembly 220 includes a pair of blades 225, that the blades 225 are respectively aligned to the positions where the diameter of the rotation region (rotation plane) of the propeller is the maximum, and/or that each of the blades 225 is aligned in the diametric direction (or the radial direction) of the rotation region (rotation plane) in the rotation region (rotation plane) (e.g., a circle) of the propeller, which is centered on the rotation axis R. However, the disclosure is not necessarily limited thereto. For example, the propeller assembly 220 of an unmanned aerial vehicle according to various embodiments of the disclosure may include one pair of blades or more, for example three blades. In this case, at least one pair of blades may be interlocked with each other and may be unfolded to positions at which the blades are aligned in the diametric direction (or radial direction) of the propeller so as to maximize the diameter of the rotation region (rotation plane). Because the blades 225 are interlocked with each other within the handle structure 223, the drags acting on respective blades 225 may be offset when the propeller rotates.

According to various embodiments, the cap 227 may include one or more fastening holes 2271 to be detachably coupled to protruding connection members 2231 and 2232 of the handle structure 223, and a shaft 2273 disposed adjacent to the fastening holes 2271. The number of fastening holes 2271 may vary depending on the number of blades 225 of the propeller assembly 220, and the inside of each of the fastening holes 2271 may be designed to have a shape corresponding to the shape of the connection members disposed on the handle structure 223.

According to an embodiment, the cap shaft 2273 is disposed on the same center line R as the rotation shaft 211 of the motor 210, and the shaft 2273 may be disposed to come into contact with the rotation shaft 211 of the motor 210 through the handle structure 223 and the hub structure 221. The cap 227 may be fastened to and rotated with the connection members 2231 and 2232 of the handle structure 223, and the rotation may transmit power to the blades 225.

Hereinafter, the structure in which the blades 225 are mounted on the handle structure 223 will be described in more detail with reference to FIGS. 10 and 11.

Figure 10A:
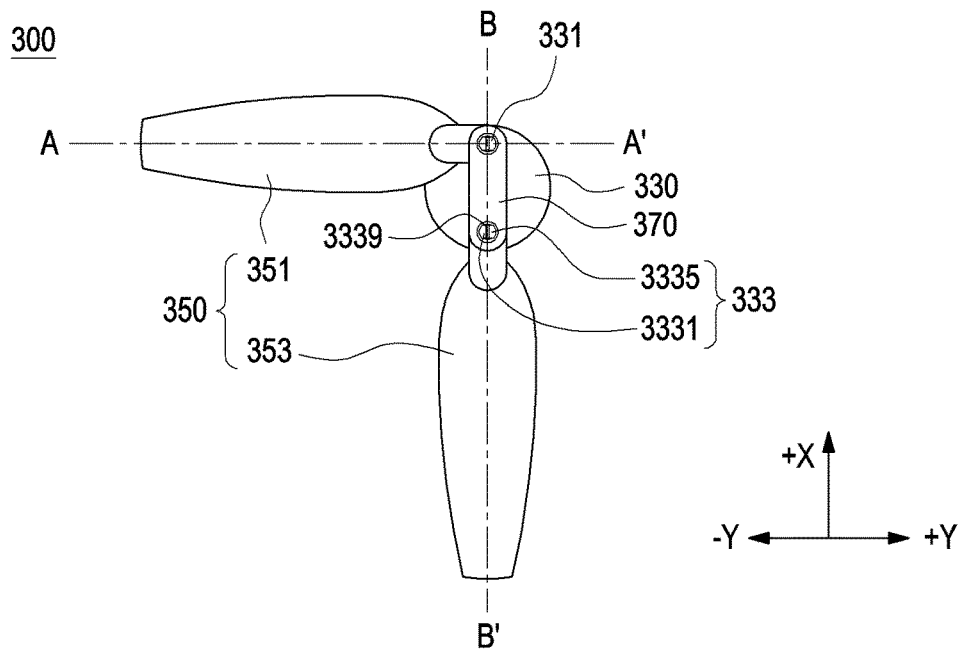
FIG. 10A is a top view illustrating the state in which the blades 350 are coupled to a handle structure 330 in a propeller assembly 300 of an unmanned aerial vehicle according to various embodiments of the disclosure.
Figure 10B:
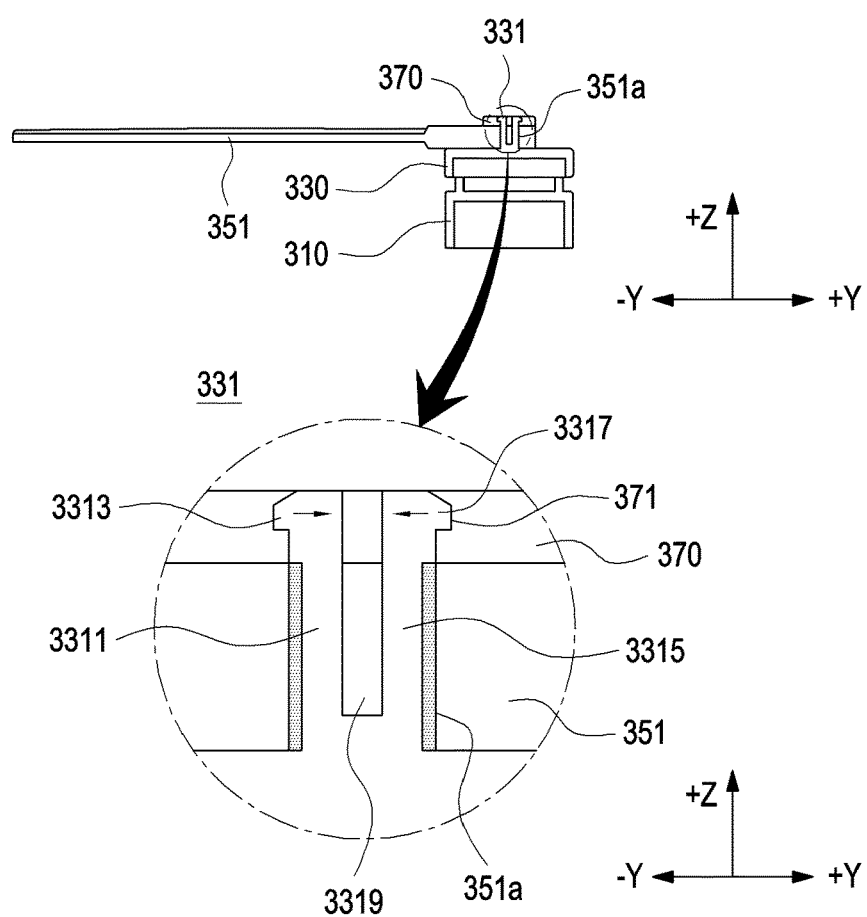
FIG. 10B is a cross-sectional view taken along line A-A' in FIG. 10A, in which an enlarged view of a portion thereof is illustrated.

FIG. 10A is a top view illustrating the state in which the blades 350 are coupled to a handle structure 330 in a propeller assembly 300 of an unmanned aerial vehicle according to various embodiments of the disclosure, and FIG. 10B is a cross-sectional view taken along line A-A' in FIG. 10A, in which an enlarged view of a portion thereof is illustrated.

The configuration of the propeller assembly 300 of FIGS. 10A and 10B may be partly or wholly the same as the configuration of the propeller assembly 220 of FIGS. 8 and 9.

Referring to FIGS. 10A and 10B, the propulsion system may include a motor (not illustrated) and a propeller assembly 300 mounted on the motor. The propeller assembly 300 may include a hub structure 310 rotatably connected to the motor (not illustrated), a handle structure 330 disposed on one surface of the hub structure 310, blades 350 mounted on the handle structure 330, and a cap 370.

According to various embodiments, a plurality of blades 350 are provided to be folded to be parallel to each other on one side thereof or to be unfolded to diametrically (or radially) aligned positions of the rotation region (rotation plane) of the propeller assembly 300. For example, the blades 350 illustrated in FIG. 10A may include a first blade 351 and a second blade 353, in which the first blade 351 may be in a folded state before the rotating operation, and the second blade 353 may be in an unfolded state for the rotation operation.

According to various embodiments, the handle structure 330 may include a first connection member 331 protruding in a direction perpendicular to the one surface (the first (+Z) direction) and a second connection member 333 extending parallel to the first connection member 331 and spaced apart from the first connection member 331. The first connection member 331 and the second connection member 333 may be coupled to the blades 350 in the state of being fixed to the one surface. For example, the first connection member 331 may be coupled to the first blade 351, and the second connection member 333 may be coupled to the second blade 353. Hereinafter, the first connection member 331 will be described with reference to the structure in which the first connection member 331 is coupled to the first blade 351, and the description will be applied to the coupling between the second connection member 333 and the second blade 353.

According to various embodiments, the first blade 351 may be coupled to the first connection member 331 of the handle structure 330 so as to be rotatable and detachable. For example, the first blade 351 may include a rotation hole 351*a* disposed in an end region and supporting a remaining rotation region, and the rotation hole 351*a* may be coupled with the first connection member 331.

According to an embodiment, the first connection member 331 may include a first post 3311 and a second post 3315 extending parallel to the first post 3311 and spaced apart from the first post 3311. The first post 3311 and the second post 3315 may be manufactured to be elastically movable with respect to each other in a second (+Y, −Y) direction perpendicular to the first (+Z) direction in the state of being fixed to the surface of the handle structure 330. For example, a slit 3319 is disposed between the first post 3311 and the second post 3315 so as to provide a space in which the first post 3311 and the second post 3315 are movable. The slit 3319 may be disposed to be shorter than the length of the first post 3311 and the second post 3315. According to an embodiment, the first post 3311 and the second post 3315 may move in directions facing each other for the detachment/attachment of the first blade 351, and in the state in which the coupling is completed, the first post 3311 and the second post 3315 may be fixed parallel to each other along a circular shape.

According to an embodiment, hooks 3313 and 3317 protruding outwards may be formed at the ends of the first post 3311 and the second post 3315, respectively. Each of the hooks 3313 and 3317 may be manufactured in a stepped shape to correspond to the shape of the fastening hole 371 in the cap 370, thereby guiding fitting engagement therebetween. For example, when the hooks 3313 and 3317 are viewed from above the propeller assembly 3300, the upper ends of the first post 3311 and the second post 3315 may have two semicircular shapes, respectively, and a slit may be disposed between the hooks 3313 and 3317. The diameter of the end of the first connection member 331 including the hooks 3313 and 3317 is manufactured to be larger than the diameter of the rotation hole 351*a* in the first blade 351, so that the first blade 351 coupled to the first connection member 331 may be fixed such that the first blade 351 cannot be separated to the outside.

According to an embodiment, the fastening hole 371 in the cap 370 may be coupled to the hooks 3313 and 3317 at the upper side (e.g., the first (+Z) direction) of the one surface to which the first connection member 331 and the first blade 351 are coupled. Like the coupling between the first blade 351 and the first connection member 331, the above-mentioned coupling may be achieved by elastically moving the first post 3311 and the second post 3315 in the second (+Y, −Y) direction with respect to each other such that the hooks 3313 and 3317 are fitted into the fastening hole 371 in the cap 370.

Figure 11A:
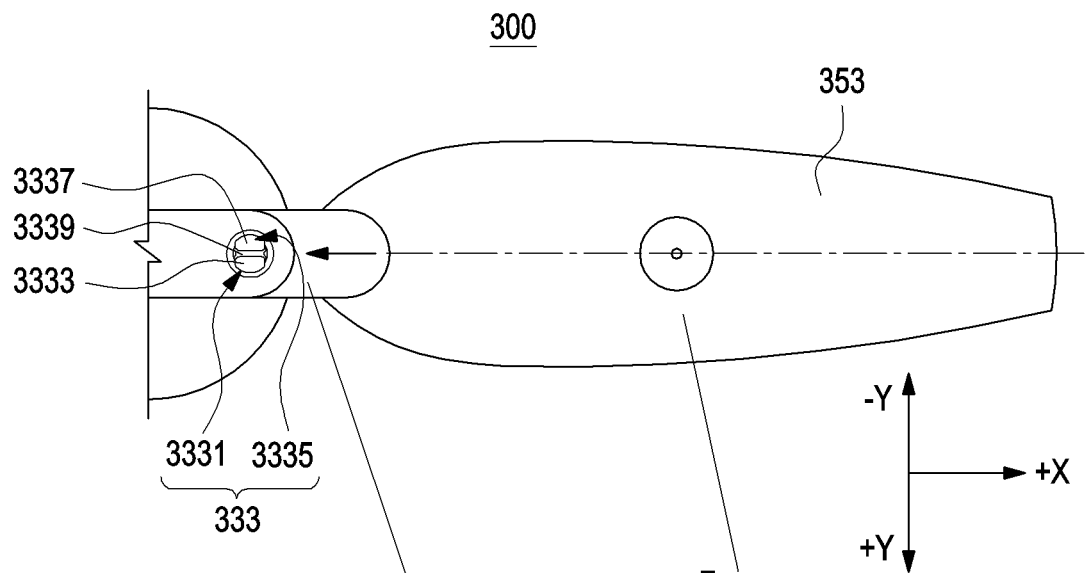
FIG. 11A is a top view illustrating the state in which a second blade 353 in FIG. 10A is coupled to a second connection member 333 in the propeller assembly 300 of the unmanned aerial vehicle according to various embodiments of the disclosure.
Figure 11B:
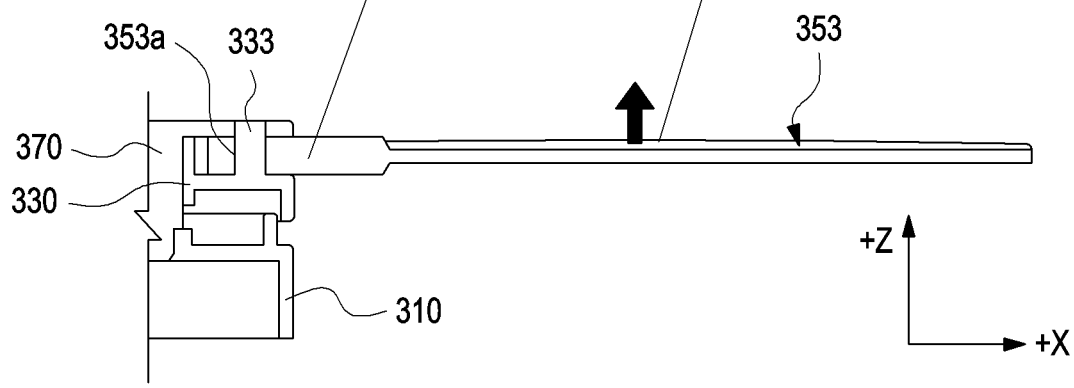
FIG. 11B is a cross-sectional view taken along line B-B' in FIG. 10A.

FIG. 11A is a top view illustrating the state in which a second blade 353 in FIG. 10A is coupled to a second connection member 333 in the propeller assembly 300 of the unmanned aerial vehicle according to various embodiments of the disclosure. FIG. 11B is a cross-sectional view taken along line B-B' in FIG. 10A.

The configuration of the propeller assembly 300 of FIGS. 11A and 11B may be partly or wholly the same as the configuration of the propeller assembly 300 of FIGS. 10A and 10B and the configuration of the propeller assembly 220 of FIGS. 8 and 9.

According to various embodiments, a plurality of blades 350 are provided to be folded to be parallel to each other on one side thereof or to be unfolded to diametrically (or radially) aligned positions of the rotation region (rotation plane) of the propeller assembly 300. For example, the second blade 353 illustrated in FIG. 11A may be in the unfolded state for the rotating operation.

According to an embodiment, the handle structure 330 may include connection members 2231 and 2232, each of which extends from one surface thereof oriented in the first (+Z) direction (the first connection member 331 and the second connection member 333 of FIG. 10A). For example, the connection members may be disposed at positions spaced apart from the rotation axis R, and each of the connection members may extend from the one surface of the handle structure 330 parallel to the rotation axis R.

The first connection member 331 and the second connection member 333 may be coupled to the blades 350 in the state of being fixed to the one surface. For example, the second connection member 333 may be coupled to the second blade 353. Hereinafter, the second connection member 333 illustrated in FIGS. 11A and 11B will be described with reference to a structure in which the second connection member 333 is coupled to the second blade 353, and the description will be applied to the coupling between the first connection member 331 and the first blade 351.

According to various embodiments, the second blade 353 may be coupled to the second connection member 333 of the handle structure 330 to be rotatable and detachable. For example, the second blade 353 may include a rotation hole 353*a* disposed in an end region and supporting a remaining rotation region, and the rotation hole 353*a* may be coupled with the second connection member 333.

According to an embodiment, the second connection member 333 may include a first post 3331 and a second post 3335 extending parallel to the first post 3331 and spaced apart from the first post 3331. The first post 3331 and the second post 3335 may be manufactured to be elastically movable with respect to each other in a second (+Y, −Y) direction perpendicular to the first (+Z) direction in the state of being fixed to the surface of the handle structure 330. For example, the first post 3331 and the second post 3335 may move in directions facing each other for the detachment/attachment of the second blade 353, and in the state in which the coupling is completed, the first post 3331 and the second post 3335 may be fixed parallel to each other along a circular shape.

According to an embodiment, in the state in which the second blade 353 is unfolded for rotation, the first post 3331 and the second post 3335 are arranged such that the first post 3331 and the second post 3335 are spaced apart from each other with a slit 3339 interposed therebetween in the center in the longitudinal direction of the second blade 353. For example, the length direction of the slit 3319 formed between the first post 3331 and the second post 3335 may be implemented to coincide with the length direction of the second blade 353.

According to an embodiment, the direction in which the slit 3339 and the hooks 3333 and 3337 are formed is related to the stability of the propeller assembly 300. For example, unlike the configuration of FIGS. 11A and 11B, when the direction of the slit is perpendicular to the longitudinal direction of the second blade 353 and the hooks are disposed in opposite directions of the slit, the force generated by the lift due to the rotation of the second blade 353 is provided to the hook of the second connection member, and the hook moves to the space in which the slit is formed, so that the second blade 353 may be separated.

According to the embodiment of FIGS. 11A and 11B, the direction in which the hooks 3333 and 3337 formed on the first post 3331 and the second post 3335 protrude from the second blade 353 may be made to be oriented in a direction perpendicular to the longitudinal direction (e.g., the second (+Y, −Y) direction). For example, the direction of the slit 3319 may be made to coincide with the longitudinal direction of the second blade 353. Accordingly, it is possible to prevent at least a portion of each of the hooks 3313 and 3317 from being pressed by a force (F_reaction (in the longitudinal direction of the second blade)) formed in the end region of the second blade 353 and generated by the force (F_Blade (the first direction (+Z direction))) formed in the wing region when the second blade 353 rotates. The propeller assembly 300 structure, in which the slit 3339 and the hooks 3333 and 3337 provide directionality, may allow the blade to stably rotate without being separated from the structure.

Hereinafter, the operation of fastening a propeller assembly 400 will be described.

Figure 12A:
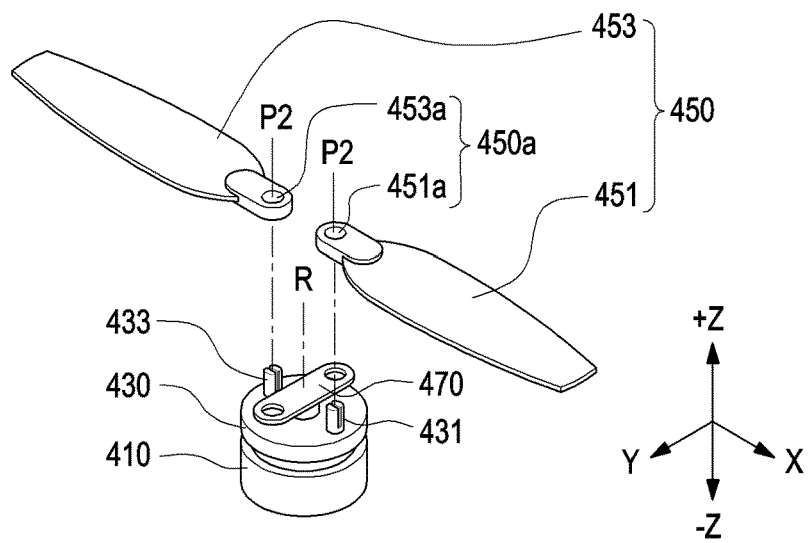
FIGS. 12A, 12B, 12C, 13A, 13B, and 13C are views illustrating a flow related to an operation of fastening a propeller assembly 400 according to various embodiments of the disclosure.
Figure 12B:
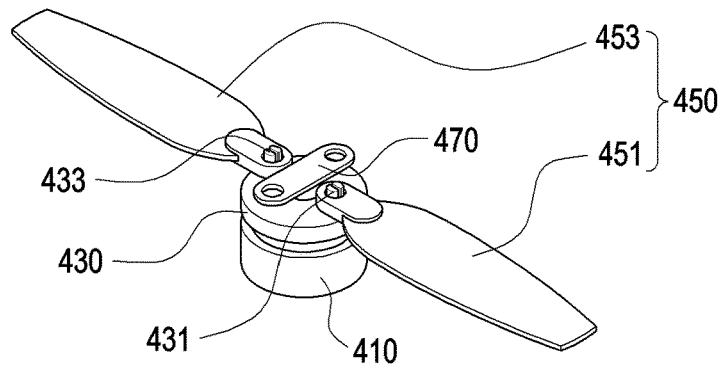
Figure 12C:
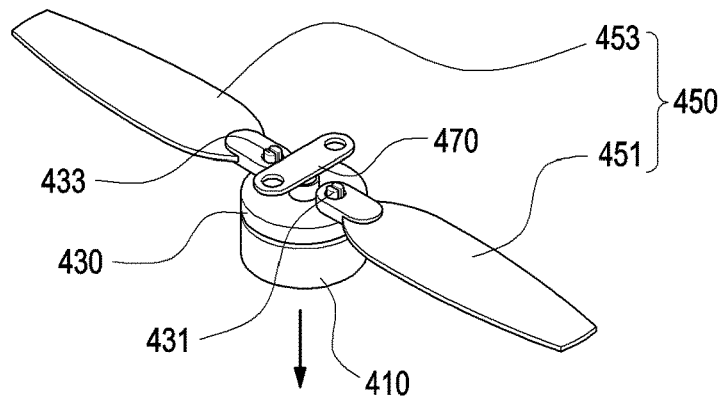
Figure 13A:
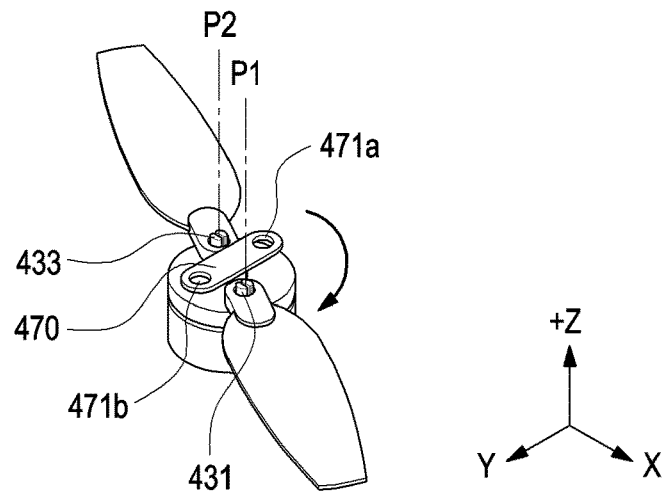
Figure 13B:
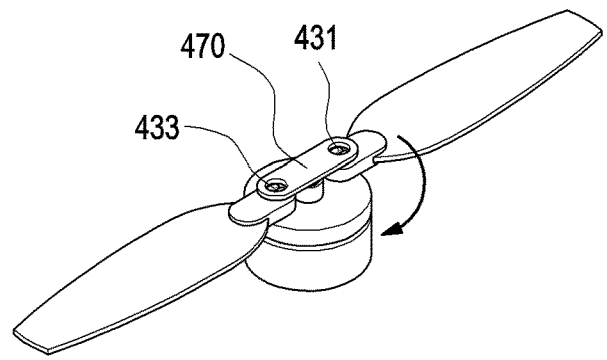
Figure 13C:
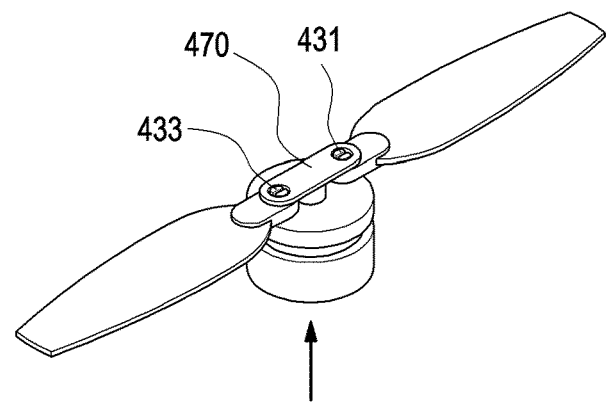
Figure 14:
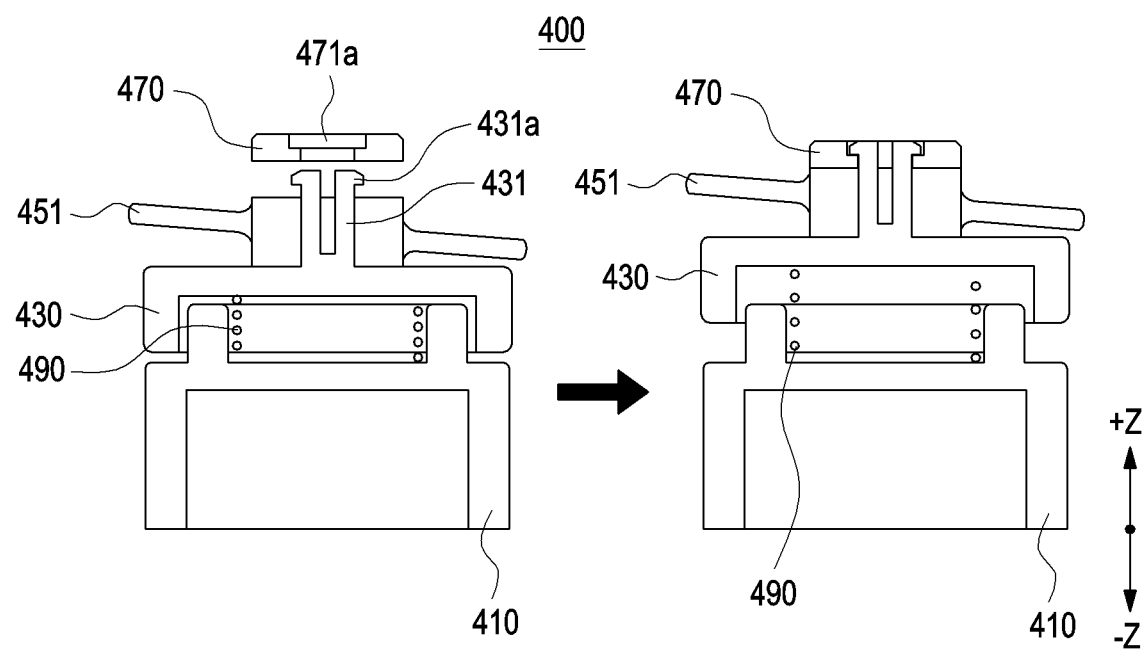
FIG. 14 is a cross-sectional view illustrating in detail the operation state in which the cap 470 and the handle structure 430 of FIG. 13C are coupled according to various embodiments of the disclosure.

FIGS. 12A to 13C are views illustrating flow related to an operation of fastening a propeller assembly 400 according to various embodiments of the disclosure. FIG. 14 is a cross-sectional view illustrating in detail the operation state in which the cap 470 and the handle structure 430 of FIG. 13C are coupled according to various embodiments of the disclosure.

The configuration of the propeller assembly 400 of FIGS. 12A to 13C may be partly or wholly the same as the configurations of the propeller assemblies 220 and 300 of FIGS. 8 to 11.

Referring to FIG. 12A, operations of fastening parts other than the blades 450 and aligning the centers of the rotation holes 450a of the blades 450 with the centers of the connection members 431 and 433 may be performed.

According to various embodiments, in the propeller assembly 400, the hub structure 410 may be coupled to surround a motor (not illustrated), and the handle structure 430 may be disposed on the upper surface of the hub structure 410. Thereafter, the shaft of the cap 470 may be inserted into the central opening in the handle structure 430 along the rotation axis R.

Thereafter, the center axes P1 and P2 of the connection members 431 and 433 protruding from one surface of the handle structure 430 may be aligned with the centers of the rotation holes 450a in the blades 450. For example, the handle structure 430 may include a first connection member 431 and a second connection member 433 disposed to be spaced apart from and parallel to each other in the first (+Z) direction. The first connection member 431 may have a first central axis P1, and the second connection member 433 may have a second central axis P2. The center of the rotation hole 451a in the first blade 451 may be aligned to coincide with the first central axis P1 of the first connection member 431, and the center of the rotation hole 453a in the second blade 453 may be aligned to coincide with the second central axis P2 of the second connection member 433.

According to an embodiment, the cap 470 may be disposed so as not to overlap the blades 450. For example, the longitudinal direction of the cap 470 and the longitudinal direction of the blades 450 may be oriented perpendicular to each other.

Referring to FIG. 12B, an operation of temporarily assembling the blades 450 to the connection members 431 and 433 of the handle structure 430 may be performed.

According to various embodiments, the rotation holes 450a in the blades 450 may be fitted onto and coupled to the connection members 431 and 433, respectively. For example, the first connection member 431 may be inserted through the rotation hole 451a in the first blade 451, and the second connection member 433 may be inserted through the rotation hole 453a in the second blade 453.

As described above, the connection members 431 and 433 include a first post and a second post, each including a hook, and the first post and the second post elastically move in the second (+Y, −Y) direction towards each other while the blades 450 are coupled thereto, and may return to the original positions thereof after the coupling is completed. The hooks formed at the end portions of the first post and the second post may overlap the edge surface of the rotation holes 450a of the blade such that the blades 450 are not separated outwards after being inserted thereinto.

Referring to FIG. 12C, in the state in which the blades 450 and the connection members 431 and 433 are temporarily assembled, the operation of pressing the handle structure 430 in the fourth (−Z) direction is performed.

According to various embodiments, an elastic member (not illustrated) is mounted in the internal space of each of the handle structure 430 and the hub structure 410, and the elastic member may provide a force for pushing the handle structure 430 in the first (+Z) direction in the state in which one surface thereof is supported by the hub structure 410. The elastic member may be used to fixedly couple the assembly structure of the propulsion system in the state in which the assembly structure of the propulsion system is in close contact therewith as a whole, and the handle structure may be pressed in the fourth (−Z) direction such that the elastic member is coupled in the pressed state.

Referring to FIGS. 13A and 13B, in the state in which the handle structure 430 is pressed, an operation of rotating the cap 470 may be performed.

According to various embodiments, the cap 470 may include one or more fastening holes 471, to be detachably coupled to protruding connection members 431 and 433 of the handle structure 430, and a shaft (e.g., the shaft 2273 of FIG. 9), disposed adjacent to the fastening holes 471. In the state in which the shaft penetrates the centers of the handle structure 430 and the hub structure 410, the edge region in which the fastening holes 471 are disposed may rotate clockwise or counterclockwise on the X-Y plane.

According to an embodiment, in response to the rotation operation of the cap 470, the longitudinal direction of the cap 470 and the longitudinal direction of the blades 450 may be aligned to coincide with each other. For example, the center of the first fastening hole 471a in the cap 470 may be aligned to coincide with the first central axis P1 of the first connection member 431, and the center of the second fastening hole 471b in the cap 470 may be aligned to coincide with the second central axis P2 of the second connection member 433.

Referring to FIGS. 13C and 14, an operation of coupling the cap 470 to the handle structure 430 and the blades 450 may be performed. FIG. 14 illustrates the state before coupling, and illustrates the coupled state.

According to various embodiments, when the force of the pressed handle structure 430 is removed, the handle structure 430 may be moved in the first (+Z) direction by the elastic force of the elastic member 490 disposed therein and may be coupled to the cap 470.

According to an embodiment, the cap 470 may include one or more fastening holes 471a to be detachably coupled to protruding connection members 431 of the handle structure 430. The number of fastening holes 471a may be variously changed depending on the number of blades of the propeller assembly 400, and may be manufactured in a form corresponding to the shape of the connection members 431 disposed on the handle structure 430.

According to an embodiment, the coupling between the first connection member 431 and the first blade 451 may be performed by inserting the hook 431a of the first connection member 431 into the fastening hole 471a in the cap 470. The fastening hole 471a formed to penetrate the inside of the cap 470 may be designed to include a stepped portion that corresponds to the shape of the hook 431a, and thus the cap 470 and the hook 431a may be fixedly fastened to each other. In the same manner as the coupling between the first connection member 431 and the hook 431a, the hook formed at the end of the second connection member 433 may also be inserted into the second fastening hole 471b in the cap 470.

After the fastening is made, due to the fastening force between the cap 470 and the hook 431a with the repulsive force of the elastic member 490 disposed inside the handle structure 430, the repulsive force due to the rotation of the first blade 451 may be controlled, and the blade may be prevented from being separated or moving from the handle structure 430.

The operation of separating the propeller assembly 400 may proceed in the reverse order of the fastening operation.

Figure 15:
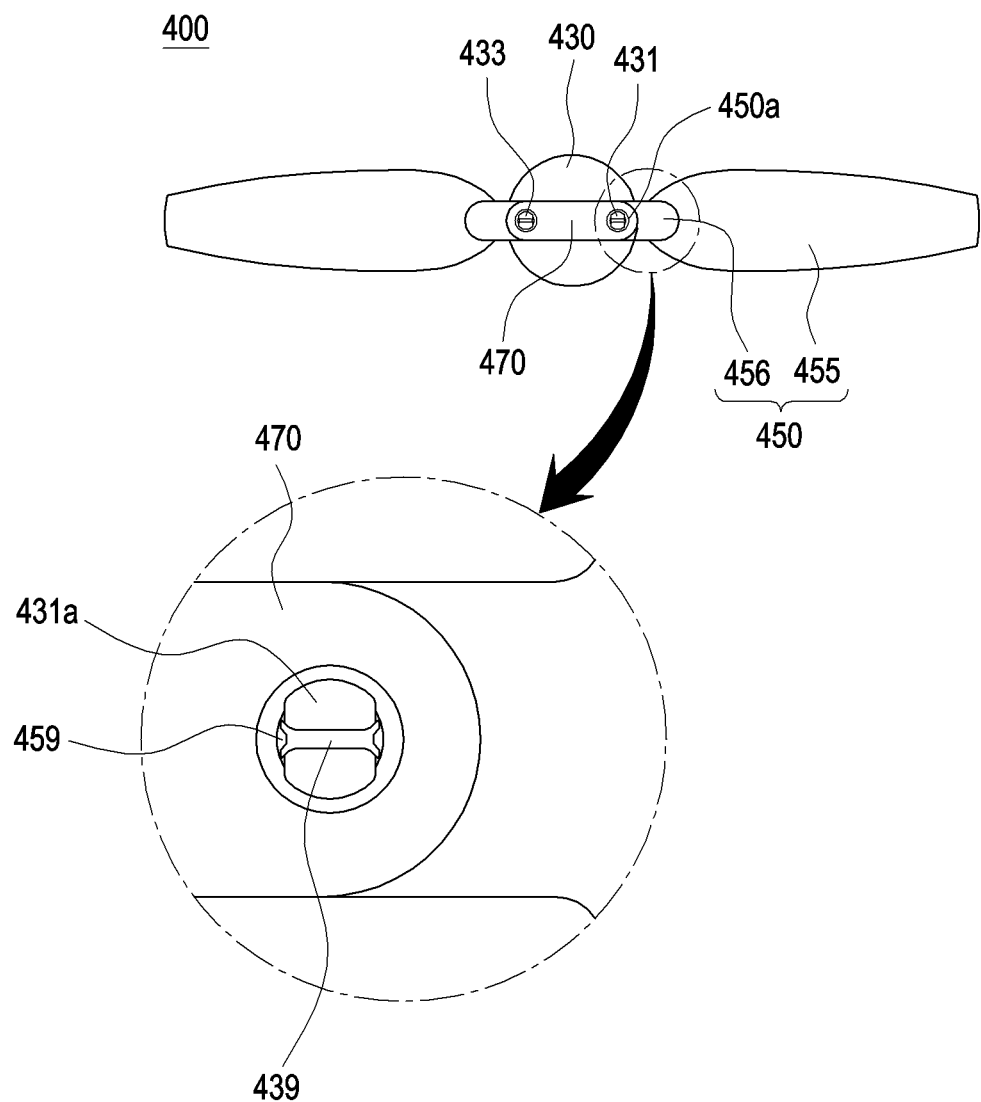
FIG. 15 is a top view illustrating the configuration of rotation holes 450a of blades 450 configured to facilitate separation of the blades 450 according to various embodiments of the disclosure.

FIG. 15 is a top view illustrating the configuration of rotation holes 450a of blades 450 configured to facilitate separation of the blades 450 according to various embodiments of the disclosure. The configuration of the blades 450 of FIG. 15 may be partly or wholly the same as the configuration of the blades 450 of FIG. 14.

Referring to FIG. 15, each of the blades 450 includes a wing region 455 and a support region 456, in which the wing region 455 generates power by rotation, and the support region 456 is capable of supporting the wing region 455.

According to various embodiments, the support region 456 may include fastening holes 450a to be fastened to the connection members 431 and 433 of the handle structure 430. Each of the rotation holes 450a may be provided with a protrusion 459 protruding thereinto. For example, the protrusion 459 may be formed in the longitudinal direction of each blade 450, and may cover at least a portion of the slit 439 of the connection member 431 or 433. The protrusions 459 may allow the user to easily disassemble the blades 450 from the connection members 431 and 433 when the blades 450 are replaced.

According to an embodiment of the disclosure, the process of separating the propeller assembly 400 may be performed after maintaining the blades 450 in the folded state. In the folded state of the blades 450, the protrusions 459 and the hooks 431a of the provided blades 450 overlap each other, and the hooks 431a may be partially deformed by the overlapping. The separation of the cap 470 may be easily performed by the generated deformation.

According to an embodiment, the protrusion 459 may be manufactured in a round shape. The round protrusions 459 may prevent the blades 450, which rotate during the flight of the unmanned aerial vehicle, from being held by being caught by portions thereof.

Figure 16A:
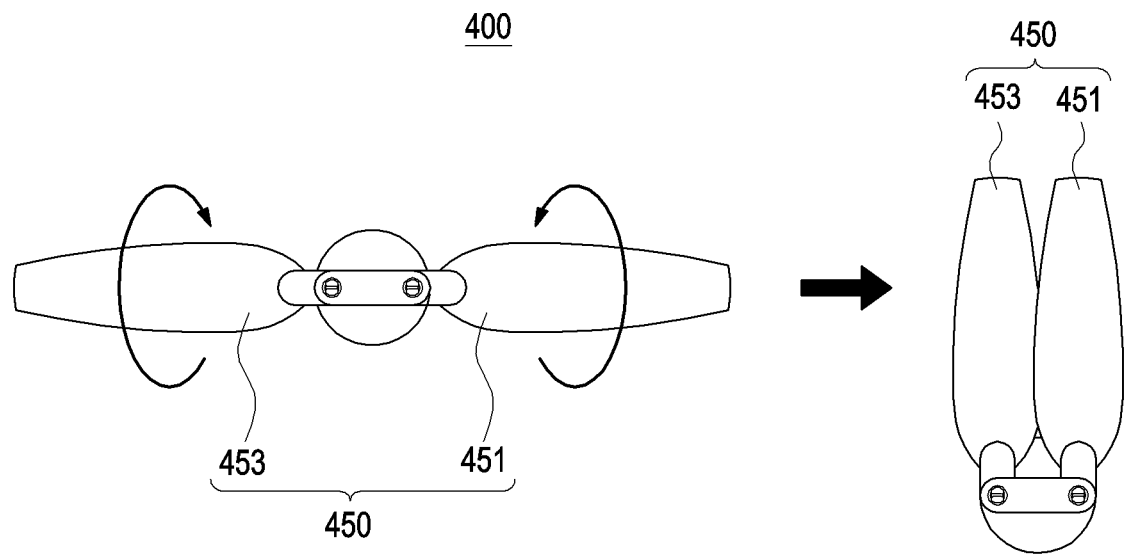
FIGS. 16A and 16B are views, each illustrating the unfolded state of the blades 450 during the operation of the unmanned aerial vehicle according to various embodiments of the disclosure and the state in which the blades 450 are aligned parallel to each other on one side thereof during storage.
Figure 16B:
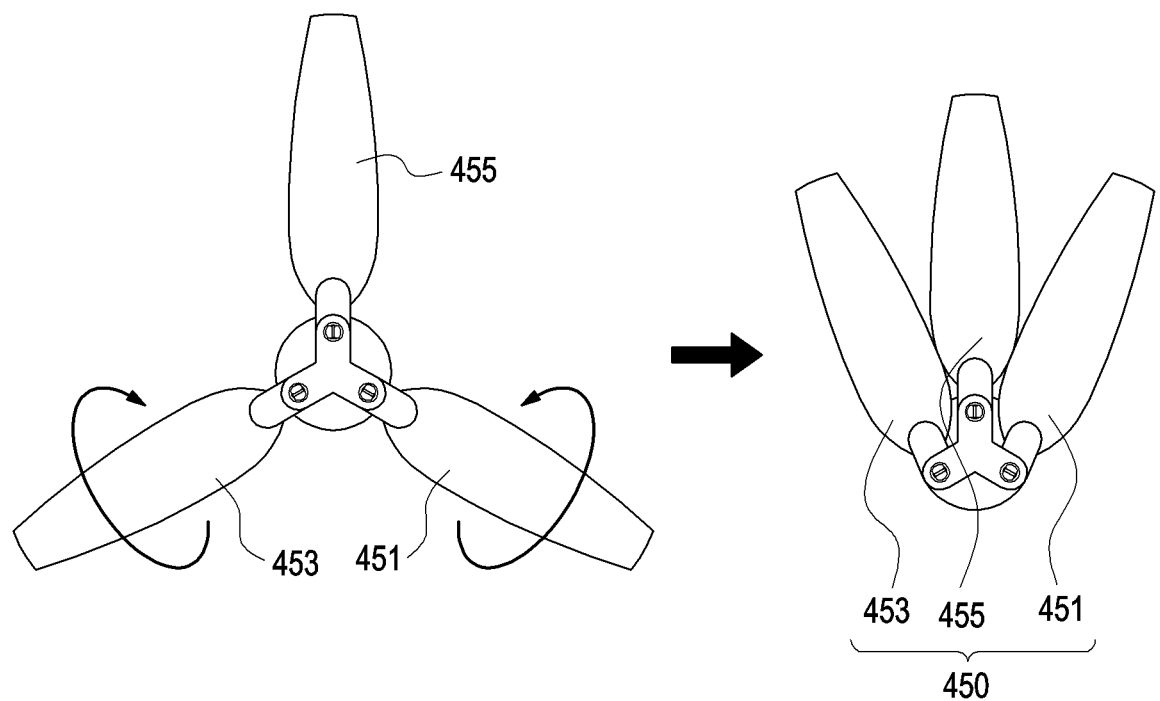

FIGS. 16A and 16B are views, each illustrating the unfolded state of the blades 450 during the operation of the unmanned aerial vehicle according to various embodiments of the disclosure and the state in which the blades 450 are aligned parallel to each other on one side thereof during storage. FIG. 16A is a view illustrating a portion of an unmanned aerial vehicle including two blades 450, and FIG. 16B is a view illustrating a portion of an unmanned aerial vehicle including three blades 450.

The configuration of the propeller assembly 500 of FIGS. 16A and 16B may be partly or wholly the same as the configurations of the propeller assemblies 220 and 300 of FIGS. 8 to 11.

Referring to FIGS. 16A and 16B, the unmanned aerial vehicle propulsion system may be provided with a plurality of blades 450. In the state in which the unmanned aerial vehicle is in operation or is ready for operation, each of the blades 450 may be rotationally driven relative to the hub 221 in the rotation region (rotation plane) of the propeller.

According to an embodiment, referring to FIG. 16A, the blades 450 may be two blades (a first blade 451 and a second blade 453), and in the state in which the unmanned aerial vehicle is in operation or is ready for operation, the main axis of the second blade 453 may be positioned to form an angle of 180 degrees with respect to the main axis of the first blade 451.

According to an embodiment, referring to FIG. 16B, the blades 450 may be three blades (a first blade 451, a second blade 453, and a third blade 455), and in the state in which the unmanned aerial vehicle is in operation or is ready for operation, the main axes of the blades 453 may be positioned such that the main axes of the different blades 450 form 120 degrees. For example, the main axis of the second blade 453 may form an angle of 120 degrees with respect to the main axis of the first blade 451, the main axis of the third blade 455 may form an angle of 120 degrees with respect to the main axis of the second blade 453, and the main axis of the first blade 451 may form an angle of 120 degrees with respect to the main axis of the third blade 455. However, the structures described above are merely an embodiment, and a design change may be made to include three or more blades depending on the design environment desired by the user, and the plurality of blades may be located at the same radius with respect to main axes thereof.

According to an embodiment, if each of the blades 450 is in the state in which the propeller does not rotate (e.g., in the storage state), the blades 450 may be positioned side by side on one side thereof.

According to an embodiment, the blades 450 may be positioned within the rotation region (rotation plane) of the propeller assembly 400 in the unfolded or folded state, and in the folded state, the blades 450 may be positioned on the frame (e.g., the frame 102 of FIG. 1) of the unmanned aerial vehicle. For example, when moved or stored, the blades 450 may be positioned on another configuration of the unmanned aerial vehicle, which enables the space occupied by the unmanned aerial vehicle to be reduced.

Figure 17:
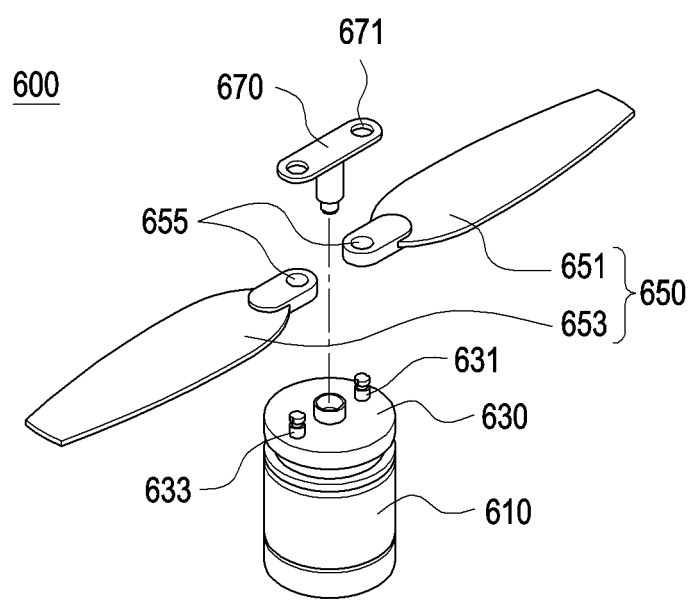
FIG. 17 is an exploded perspective view illustrating an unmanned aerial vehicle propulsion system 600 according to various embodiments of the disclosure.
Figure 18:
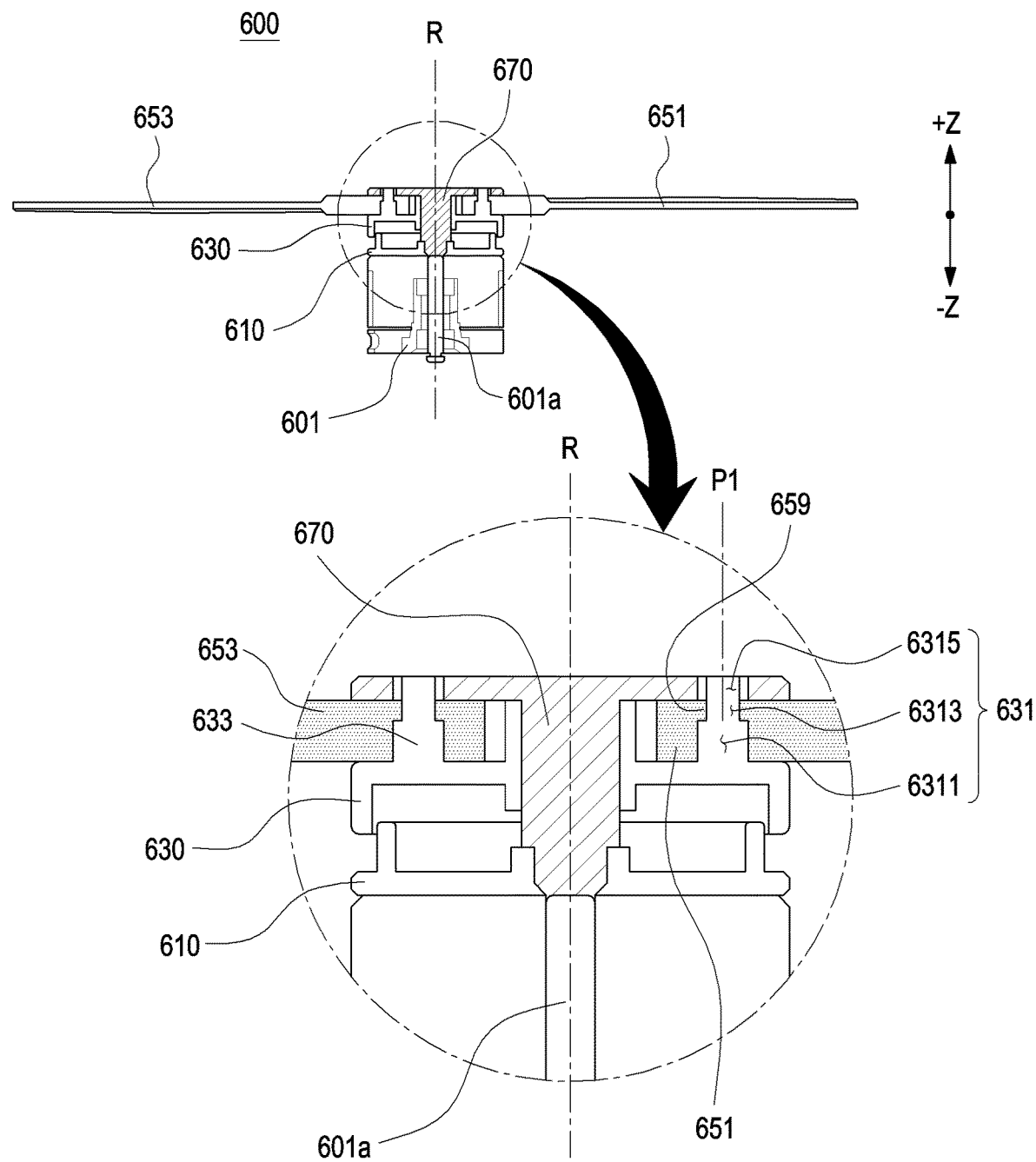
FIG. 18 is a cross-sectional view illustrating the unmanned aerial vehicle propulsion system 600 according to various embodiments of the disclosure, in which an enlarged view of a portion thereof is illustrated.

FIG. 17 is an exploded perspective view illustrating an unmanned aerial vehicle propulsion system 600 according to various embodiments of the disclosure. FIG. 18 is a cross-sectional view illustrating the unmanned aerial vehicle propulsion system 600 according to various embodiments of the disclosure, in which an enlarged view of a portion thereof is illustrated.

Referring to FIGS. 17 and 18, the propulsion system 600 (e.g., the propulsion system 104 of FIG. 1) may include a motor 601 mounted on a frame (e.g., the frame 102 of FIG. 1) and a propeller assembly 602 mounted on the motor 601. The propeller assembly 602 may include a hub structure 610 rotatably connected to the motor 601, a handle structure 630 disposed on one surface of the hub structure 610, blades 650 mounted on the handle structure 630, and a cap 670.

The configuration of the propeller assembly 602 of FIGS. 17 and 18 may be partly or wholly the same as the configuration of the propeller assembly 220 of FIGS. 8 and 9. Hereinafter, the handle structure 630, which is structurally different from the propeller assembly 220 of FIGS. 8 and 9, and the blades 650 coupled to the handle structure 630 will be described in detail.

According to various embodiments, the handle structure 630 may be mounted on a portion (e.g., an end portion) of the hub structure 610 so as to be rotated about the rotation axis R by the rotation shaft 601a of the motor 601. The bottom surface of the handle structure 630 may be opened such that a portion of the elastic member (not illustrated) may be fixedly inserted therein.

According to an embodiment, the handle structure 630 may include connection members 631 and 633, each of which extends from one surface thereof oriented in the first (+Z) direction. For example, the connection members 631 and 633 may be disposed at positions spaced apart from the rotation axis R, and each of the connection members 631 and 633 may extend from the one surface of the handle structure 630 parallel to the rotation axis R.

According to an embodiment, the handle structure 630 may include a first connection member 631 protruding in a direction perpendicular to the one surface (the first (+) direction) and a second connection member 633 extending parallel to the first connection member 631 and spaced apart from the first connection member 631. The first connection member 631 and the second connection member 633 may be coupled to the blades 650 in the state of being fixed to the one surface. Each of the first connection member 631 and the second connection member 633 may be formed in a substantially cylindrical shape.

According to an embodiment, the first connection member 631 may include a first portion 6311 extending from one surface of the handle structure 630 oriented in the first (+Z) direction, a second portion 6313 extending from the first portion 6311 and having a diameter different from that of the first portion 6311, and a third portion 6315 extending from the second portion 6313 and provided with at least one groove 6317. Each of the first portion 6311, the second portion 6313, and the third portion 6315 may have a substantially cylindrical shape, and the central axes P1 of the first portion 6311, the second portion 6313, and the third portion 6315 may be arranged on the same line.

According to an embodiment, the diameters of the second portion 6313 and the third portion 6315 may have different sizes. For example, the diameter of the second portion 6313 may be smaller than the diameter of the third portion 6315. When viewed from the cross section illustrated in FIG. 18, the second portion 6313 is manufactured to form a stepped shape inwardly from the third portion 6315, and one region of the protrusion 659 of the blade 650 may be inserted into and fastened from the first portion 6311 to the second portion 6313.

According to an embodiment, the diameters of the first portion 6311 and the third portion 6315 may have the same size. The first portion 6311 may have at least one groove 6317, which is formed by inwardly cutting a portion of the cylindrical outer surface thereof. For example, multiple grooves 6317 (e.g., two grooves) may be formed, and the two grooves 6317 may be disposed on a straight line with respect to the central axis P1. The groove 6317 may have a shape corresponding to the shape of the protrusion 659 of each blade 650 so as to be fitted onto the protrusion 659.

According to an embodiment, the third portion 6315 and the second portion 6313 protruding in the vertical direction from one surface of the handle structure 630 may be coupled to the rotation hole 655 in each blade 650. The first portion 6311 may be coupled to the fastening hole 671 in the cap 670 in the state in which the first portion 6311 is exposed to the outside through the rotation hole 655 in the blade 650. The fastening hole 671 in the cap 670 may be manufactured to have a shape corresponding to the shape of the first portion 6311 including the at least one groove 6317 and may be fitted onto the first portion 6311. The second connection member 633 may have the same shape and size as the first connection member 631.

According to various embodiments, a plurality of blades 650 are provided to be folded so as to be parallel to each other on one side thereof or to be unfolded to diametrically (or radially) aligned positions of the rotation region (rotation plane) of the propeller assembly 602. For example, the blades 650 may include a first blade 651 and a second blade 653.

According to an embodiment, the first blade 651 may be coupled to the first connection member 631 of the handle structure 630 to be rotatable and detachable. For example, the first blade 651 may include a rotation hole 655 disposed in an end region and supporting a remaining rotation region, and the rotation hole 655 may be coupled with the first connection member 631.

According to an embodiment, the rotation hole 655 in the first blade 651 may be provided with a protrusion 659 (the protrusion 659 of FIG. 18) protruding into the hole. The protrusion 659 may protrude in a direction perpendicular to the longitudinal direction of the first blade 651 and into the hole. For example, multiple protrusions 659 (e.g., two protrusions) may be formed, and the two protrusions 6317 may be disposed on a straight line with respect to the central axis P1. The protrusion 659 may have a shape corresponding to the shape of the groove 6317 in the first connection member 631 so as to be fitted into the groove 6317. As another example, the second blade 653 may be the same shape and size as the first blade 651.

Figure 19A:
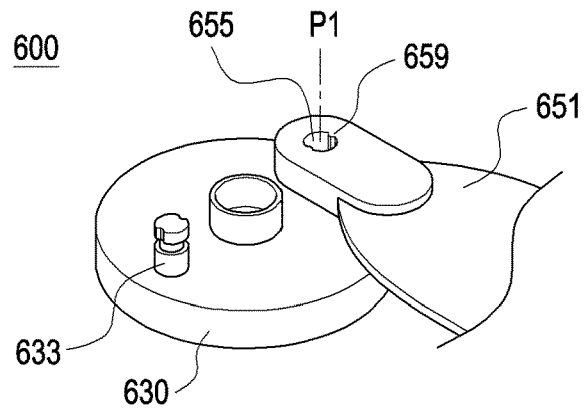
FIGS. 19A, 19B, and 19C are views illustrating a flow of an operation of assembling a handle structure 630 and a blade 650 of the unmanned aerial vehicle propulsion system 600 according to various embodiments of the disclosure.
Figure 19B:
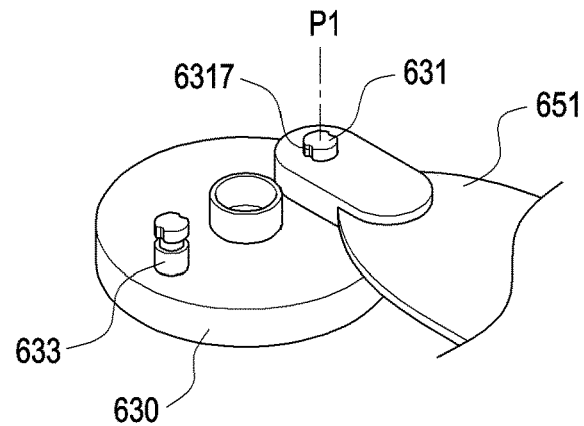
Figure 19C:
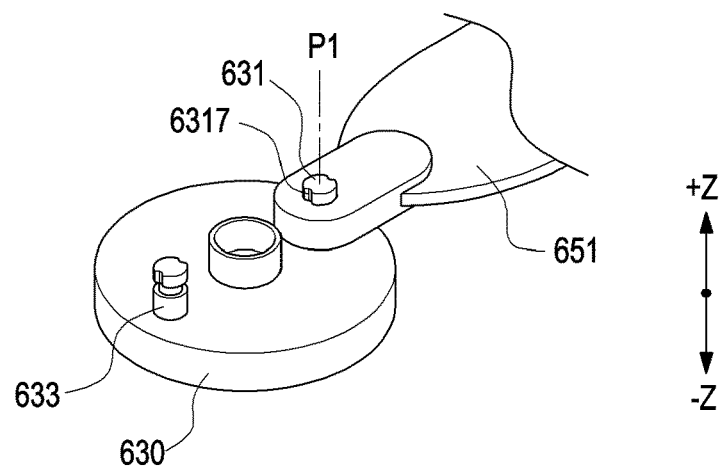

FIGS. 19A to 19C are views illustrating a flow of an operation of assembling a handle structure 630 and a blade 650 of the unmanned aerial vehicle propulsion system 600 according to various embodiments of the disclosure.

The configurations of the handle structure 630 and the blades 650 of FIGS. 19A to 19D may be partly or wholly the same as the configurations of the handle structure 630 and the blades 650 of FIGS. 17 and 18.

According to various embodiments, an operation of coupling the first blade 621 (the first blade 651 of FIG. 17) to the first connection member 631 (the first connection member 631 of FIG. 17) of the handle structure 630 is presented.

Referring to FIG. 19A, an operation of fitting the rotation hole 655 of the first blade 651 onto the first connection member 631 may be performed. The first blade 651 is in the folded state, and the rotation hole 655 may be fitted in the state of being aligned with the central axis P1 of the first connection member 631. For example, the protrusion 659 of the first blade 651 may be inserted into two grooves (the grooves 6317 of FIG. 17) formed in the third portion (the third portion 6315 of FIG. 17) of the first connection member 631 in the state of protruding in a direction perpendicular to the main axis of the first blade 651.

According to an embodiment, the grooves 6317 in the first connection member 631 have a structure cut in a direction perpendicular to the main axis of the first blade 651, and the grooves 6317 and the protrusions 659 are correspondingly fitted to each other.

Referring to FIG. 19B, the first blade 651 may be coupled in the state of being seated on the outer surfaces of the second and third portions 6313 and 6315 after passing through the first portion 6311 of the first connection member 631. Since the third portion 6315 is a position at which the cap (the cap 670 of FIG. 17) is coupled, the first blade 651 may move downwards (e.g., in the fourth (−Z) direction) until the first blade 651 comes into contact with the upper surface of the handle structure 630.

Referring to FIG. 19C, it is possible to confirm the state in which the first blade 651 rotates in the state of being seated on the first connection member 631 and the rotation is completed. The first blade 651 may rotate clockwise or counterclockwise with respect to the central axis P1 in the state of penetrating the center of the first connection member 631.

According to an embodiment, through the rotation of the first blade 651, the protrusion 659 of the first blade 651 and the groove 6317 of the first connection member 631 do not coincide with each other, and thus the first blade 651 is not separable to the outside of the first connection member 631. In order to operate the unmanned aerial vehicle propulsion system 600, when the first blade 651 is fully unfolded, the directions in which the protrusion 659 of the first blade 651 and the groove 6317 in the first connection member 631 are arranged may be positioned to be perpendicular to each other respect to the central axis P1.

According to an embodiment, the rotation of the protrusion 659 of the first blade 651 is performed along the stepped outer surface of the second portion 6313, and the thickness of the protrusion 659 may be the same as or smaller than the length of the second portion 6313. Thereafter, the cap 670 may be fitted to the exposed first portion 6311. As another example, the description of the coupling between the second blade and the second connection member 633 may be applicable to the coupling between the first blade 651 and the first connection member 631.

Figure 20:
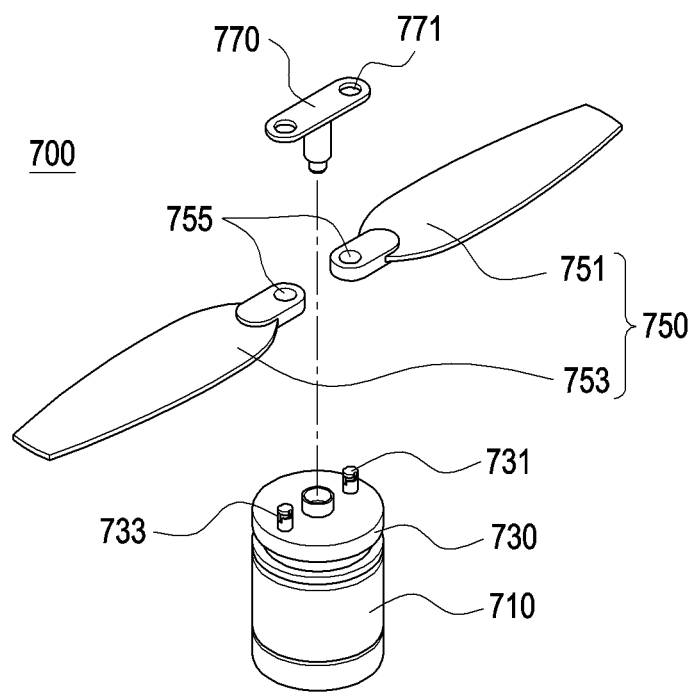
FIG. 20 is an exploded perspective view illustrating an unmanned aerial vehicle propulsion system 700 according to various embodiments of the disclosure.
Figure 21:
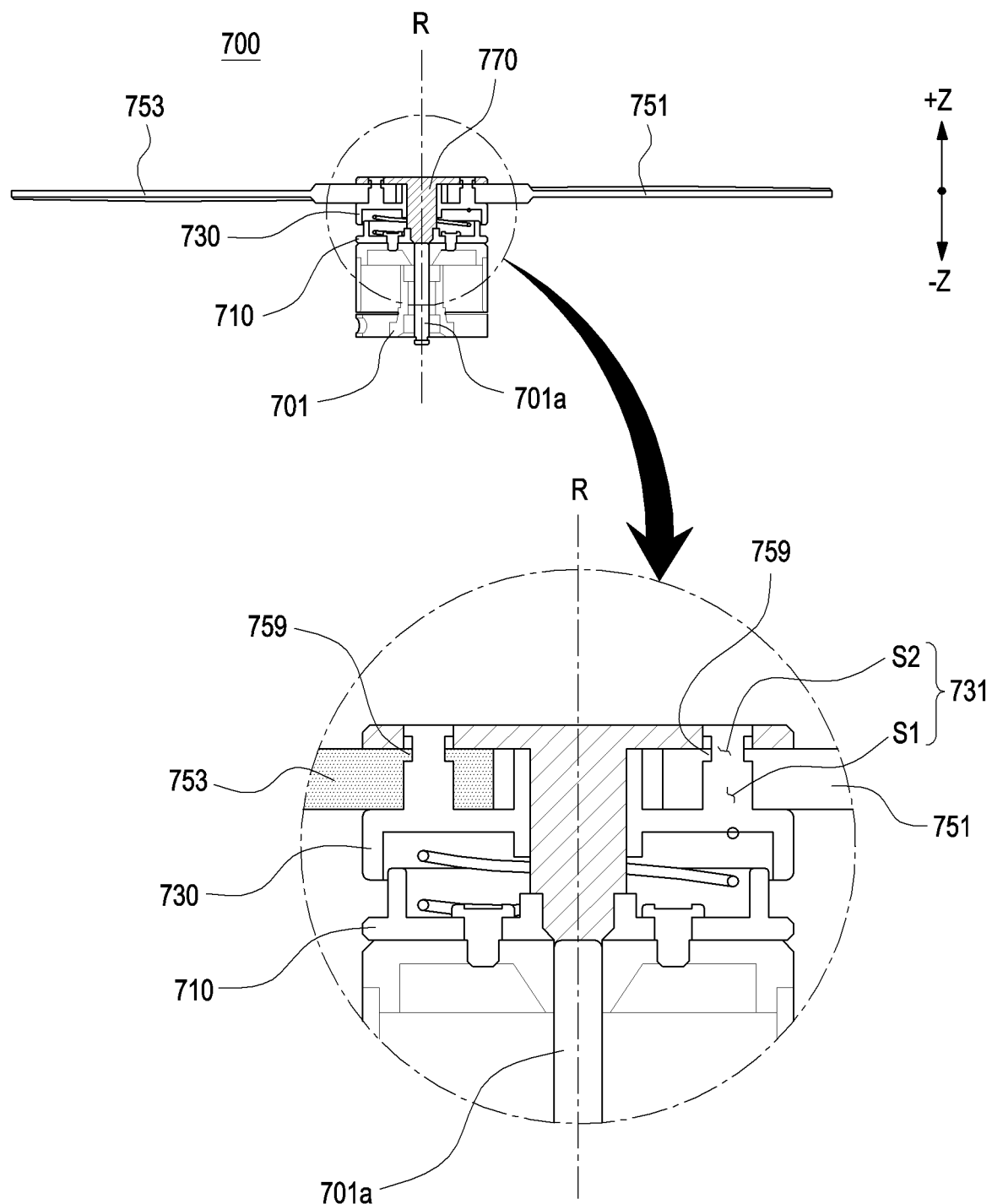
FIG. 21 is a cross-sectional view illustrating the unmanned aerial vehicle propulsion system 700 according to various embodiments of the disclosure, in which an enlarged view of a portion thereof is illustrated.
Figure 22:
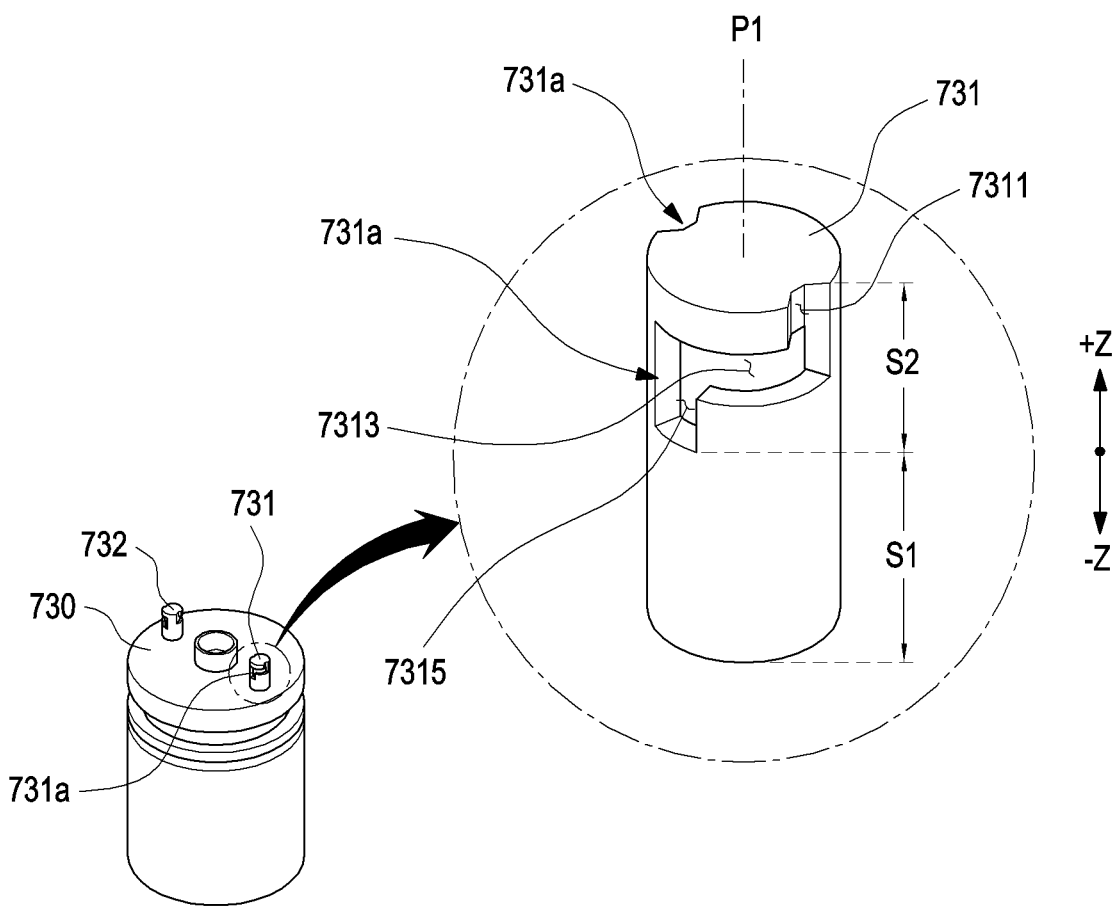
FIG. 22 is an enlarged view illustrating a connection member of a handle structure 730 according to various embodiments of the disclosure.

FIG. 20 is an exploded perspective view illustrating an unmanned aerial vehicle propulsion system 700 according to various embodiments of the disclosure. FIG. 21 is a cross-sectional view illustrating the unmanned aerial vehicle propulsion system 700 according to various embodiments of the disclosure, in which an enlarged view of a portion thereof is illustrated. FIG. 22 is an enlarged view illustrating a connection member of a handle structure 730 according to various embodiments of the disclosure.

Referring to FIGS. 20 to 22, the propulsion system 700 (e.g., the propulsion system 104 of FIG. 1) may include a motor 701 mounted on a frame (e.g., the frame 102 of FIG. 1) and a propeller assembly 702 mounted on the motor 701. The propeller assembly 702 may include a hub structure 710 rotatably connected to the motor 701, a handle structure 730 disposed on one surface of the hub structure 710, blades 750 mounted on the handle structure 730, and a cap 770.

The configuration of the propeller assembly 702 of FIGS. 20 to 22 may be partly or wholly the same as the configuration of the propeller assembly 220 of FIGS. 8 and 9. Hereinafter, the handle structure 730, which is structurally different from the propeller assembly 220 of FIGS. 8 and 9, and the blades 750 coupled to the handle structure 730 will be described in detail.

According to various embodiments, the handle structure 730 may be mounted on a portion (e.g., an end portion) of the hub structure 710 so as to be rotated about the rotation axis R by the rotation shaft 701a of the motor 701. The bottom surface of the handle structure 730 may be opened such that a portion of the elastic member (not illustrated) may be fixedly inserted therein.

According to an embodiment, the handle structure 730 may include connection members 731 and 733, each of which extends from one surface thereof oriented in the first (+Z) direction. For example, the connection members 731 and 733 may be disposed at positions spaced apart from the rotation axis R, and each of the connection members 731 and 733 may extend from the one surface of the handle structure 730 parallel to the rotation axis R.

According to an embodiment, the handle structure 730 may include a first connection member 731 protruding in a direction perpendicular to the one surface (the first (+Z) direction) and a second connection member 733 extending parallel to the first connection member 731 and spaced apart from the first connection member 731. The first connection member 731 and the second connection member 733 may be coupled to the blades 750 in the state of being fixed to the one surface. Each of the first connection member 731 and the second connection member 733 may be formed in a substantially cylindrical shape.

According to an embodiment, the first connection member 731 may include a first portion S1, extending from one surface of the handle structure 730 oriented in the first (+Z) direction, and a second portion S2, extending from the first portion S1 and provided with at least one guide groove 731a. Each of the first portion S1 and the second portion S2 may have a substantially cylindrical shape, and the central axes P1 of the first portion S1 and the second portion S2 may be arranged on the same line.

According to an embodiment, the diameters of the first portion S1 and the second portion S2 may have the same size. The first portion S1 may have at least one guide groove 731a, which is formed by inwardly cutting a portion of the cylindrical outer surface thereof. For example, multiple guide grooves 731a (e.g., two guide grooves) may be formed, and the two guide grooves 731a may be disposed on a straight line with respect to the central axis P1. The guide groove 731a may have a shape corresponding to the shape of the protrusion 759 of each blade 750 so as to be fitted onto the protrusion 759.

According to an embodiment, one guide groove 731a in the second portion S2 may be formed of three portions, which are at least partially formed at different positions. The guide groove 731a may include a first guide groove 7311 extending from the upper end and formed in a fourth (−Z) direction, a second guide groove 7313 formed along the outer surface of the first connection member 731 in a direction perpendicular to the direction in which the first guide groove 7311 is oriented, and a third guide groove 7315 extending from the second guide groove 7313 and formed in the −Z direction. For example, the guide groove 731a may have a "⌐" shape or a "⌙" shape. The first guide groove 7311, the second guide groove 7313, and the third guide groove 7315 may guide the direction in which the protrusion 759 of the first blade 751 moves. For example, the protrusion 759 of the first blade 751 may move through the first guide groove 7311 and the second guide groove 7313 to the third guide groove 7315. As another example, the second connection member 733 may have the same shape and size as the first connection member 731.

According to various embodiments, a plurality of blades 750 are provided to be folded to be parallel to each other on one side thereof or to be unfolded to diametrically (or radially) aligned positions of the rotation region (rotation plane) of the propeller assembly 702. For example, the blades 750 may include a first blade 751 and a second blade 753.

According to an embodiment, the first blade 751 may be coupled to the first connection member 731 of the handle structure 730 so as to be rotatable and detachable. For example, the first blade 751 may include a rotation hole 755 formed in an end region and supporting a remaining rotation region, and the rotation hole 755 may be coupled with the first connection member 731.

According to an embodiment, the rotation hole 755 in the first blade 751 may be provided with a protrusion 759 (the protrusion 759 of FIG. 20) protruding into the hole. The protrusion 759 may protrude in a direction perpendicular to the longitudinal direction of the first blade 751 and into the hole. For example, multiple protrusions 759 (e.g., two protrusions) may be formed, and the two protrusions 759 may be disposed on a straight line with respect to the central axis P1. The protrusion 759 may have a shape corresponding to the shape of the guide groove 731a in each blade 731 so as to be fitted into the guide groove 6317. As another example, the second blade 753 may have the same shape and size as the first blade 751.

FIGS. 23A to 23D are views illustrating a flow of an operation of assembling a handle structure 730 and a blade 750 of the unmanned aerial vehicle propulsion system 700 according to various embodiments of the disclosure.

The configurations of the handle structure 730 and the blades 750 of FIGS. 23A to 23D may be partly or wholly the same as the configurations of the handle structure 730 and the blades 750 of FIGS. 21 and 22.

According to various embodiments, an operation of coupling the first blade 621 (the first blade 751 of FIG. 20) to the first connection member (the first connection member 731 of FIG. 20) of the handle structure 730 is presented.

Figure 23A:
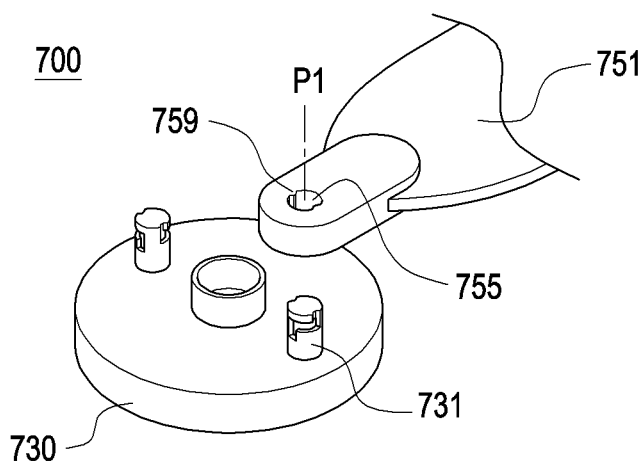
FIGS. 23A, 23B, 23C, and 23D are views illustrating a flow of an operation of assembling a handle structure 730 and a blade 750 of the unmanned aerial vehicle propulsion system 700 according to various embodiments of the disclosure.

Referring to FIG. 23A, an operation of aligning the rotation hole 755 in the first blade 751 with the first connection member 731 before fitting may be performed. The first blade 751 is in the folded state, and the rotation hole 755 may be positioned in the state of being aligned with the central axis P1 of the first connection member 731. For example, the protrusion 759 of the first blade 751 may be inserted into two first guide grooves (the first guide grooves 7311 of FIG. 17) formed in the second portion (the second portion S2 of FIG. 22) of the first connection member 731 in the state of protruding in a direction perpendicular to the main axis of the first blade 751.

Figure 23B:
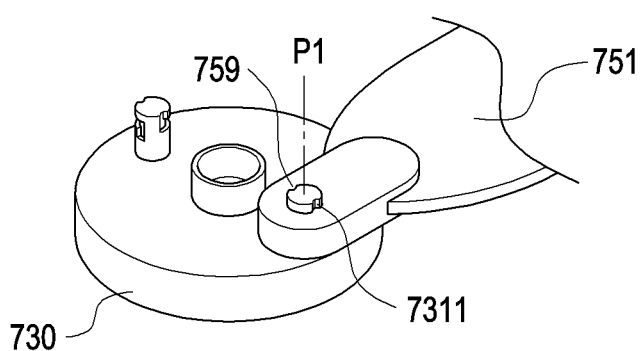

Referring to FIG. 23B, the first blade 751 may be coupled to at least a portion of the second portion S2 of the first connection member 731.

According to an embodiment, the first blade 751 may be inserted into and fastened the first guide groove 7311 by moving in the −Z direction in the state in which the protrusion 759 is aligned with the first guide groove 7311 in the first connection member 731. The first blade 751 may be moved in the −Z direction by the length of the first guide groove 7311.

Figure 23C:
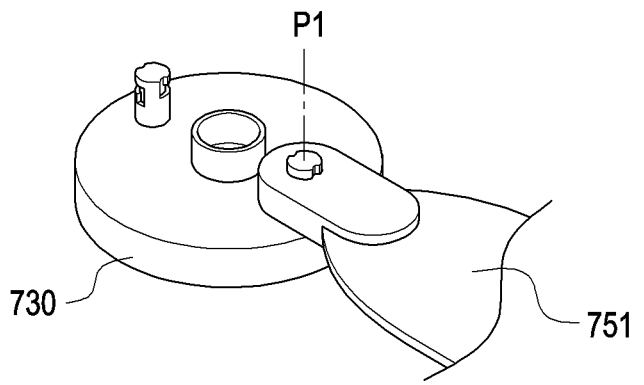

Referring to FIG. 23C, the first blade 751 may move along the second guide groove 7313 of the first connection member 731.

According to an embodiment, through the rotation of the first blade 751, the protrusion 759 of the first blade 751 and the first guide groove 7311 of the first connection member 731 do not coincide with each other, and thus the first blade 751 is not separable to the outside of the first connection member 731 in the first (+Z) direction.

According to an embodiment, the first blade 751 may rotate clockwise or counterclockwise with respect to the central axis P1 in the state of penetrating the first connection member 731, and the angle to which the first blade 751 is rotated may be 90 degrees. The first blade 751 may move along the outer surface of the second portion S2 depending on the configuration formed by the second guide groove 7313.

Figure 23D:
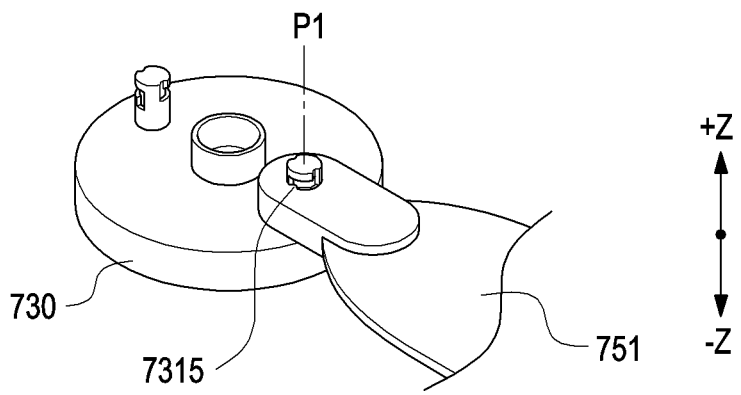

Referring to FIG. 23D, in the state in which the rotation is completed, the first blade 751 may move along the third guide groove 7315 of the first connection member 731.

According to an embodiment, the first blade 751 may move in the −Z direction by the length of the third guide groove 7315. The protrusion 759 of the first blade 751 seated in the third guide groove 7315 does not coincide with the direction of the first guide groove 7311 of the first connection member 731, and thus the first blade 751 is not separable to the outside of the first connection member 731. In order to operate the unmanned aerial vehicle propulsion system 200, when the first blade 751 is fully unfolded, the directions in which the main axis of the protrusion 759 of the first blade 751 and the main axis of the third guide groove 7315 in the first connection member 731 are arranged may be positioned to be perpendicular to each other respect to the central axis P1. Thereafter, the cap 770 may be fitted to the exposed first portion 7311. As another example, the description of the coupling between the second blade and the second connection member 733 may be applicable to the coupling between the first blade 751 and the first connection member 731.

According to various embodiments of the disclosure, an unmanned aerial vehicle may include: a housing; a wireless communication module located inside or connected to the housing, and configured to perform wireless communication with an external controller; a plurality of propulsion systems connected to the housing or at least partially mounted in the housing; and a navigation circuit configured to control the propulsion systems.

At least one of the plurality of propulsion systems may include a motor controlled by the navigation circuit and a propeller assembly rotatably connected to the motor.

The propeller assembly may include: a hub structure configured to be rotated by the motor, the hub structure including a surface facing away from the motor; a first connection member protruding from the surface in a first direction perpendicular to the surface, the first connection member including a first post and a second post extending parallel to the first post and spaced apart from the first post, the first post and the second post being elastically movable in a second direction perpendicular to the first direction in the state of being fixed to the surface; a first blade detachably coupled to the first connection member, the first blade including an opening to which the first post and the second post are coupled; and a cap detachably coupled to an upper portion of the first connection member.

According to various embodiments, the first blade may have an elongated shape having an axis extending in a third direction perpendicular to the first direction when viewed from above the surface.

According to various embodiments, the third direction may be perpendicular to the second direction.

According to various embodiments, the first blade may be rotatable relative to the first connection member between a mounting position and a dismounting position.

According to various embodiments, the third direction may be perpendicular to the second direction at the mounting position, and the third direction may be the same as the second direction at the dismounting position.

According to various embodiments, the propeller assembly may further include a second connection member protruding from the surface in the first direction and spaced apart from the first connection member and a second blade detachably coupled with the second connection member.

According to various embodiments, the propeller assembly may further include a third connection member protruding from the surface in the first direction and spaced apart from the first connection member and the second connection member and a third blade detachably coupled with the third connection member.

According to various embodiments, a slit may be formed between the first post and the second post of the first connection member, and the slit may provide a space in which the first post and the second post are movable in the second direction.

According to various embodiments, the upper end of each of the first post and the second post may include a hook protruding outwards with respect to the slit, and the hook may be fitted into the fastening hole formed in the cap.

According to various embodiments, the slit may be formed in the third direction parallel to the main axis direction of the first blade, and the hook may be formed to be oriented in the second direction perpendicular to the third direction.

According to various embodiments, the opening in the first blade may include at least one protrusion that protrudes inwards in the longitudinal direction of the first blade, and the protrusion may have a round shape.

According to various embodiments of the disclosure, a propeller assembly, included in an unmanned aerial vehicle, may include:
a hub structure disposed to surround at least a portion of a motor and configured to rotate depending on the operation of the motor; a handle structure disposed on one surface of the hub structure and including at least one connection member protruding in a first direction perpendicular to the one surface; at least one blade including a rotation hole detachably coupled to the at least one connection member, the blade being configured to rotate in response to rotation of the handle structure; an elastic member disposed inside the hub structure and configured to provide an elastic force inside the handle structure; and a cap detachably coupled to an upper end of the at least one connection member.

According to various embodiments, the handle structure may include an opening disposed in a central region through which a shaft of the cap passes, and a plurality of connection members disposed in a straight line on opposite sides with respect to the opening. The diameter of the upper end of each connection member may be larger than the diameter of another portion of the connection member.

According to various embodiments, the at least one connection member may include a first post and a second post extending parallel to the first post and spaced apart from the first post, and the first post and the second post may be elastically movable relative to each other in a second direction perpendicular to the first direction in a state of being fixed to the surface.

According to various embodiments, in the cap, the shaft disposed in the central region of the cap may be arranged on the same line as the motor, and a plurality of fastening holes, which are arranged with the shaft interposed therebetween, may be detachably coupled to the hook disposed at respective upper ends of the connection members.

According to various embodiments, each connection member may include a first portion extending from the one surface of the handle structure in the first direction, a second portion extending from the first portion and having a diameter different from the diameter of the first portion, and a third portion extending from the second portion and having therein at least one groove, and the central axes of the first portion, the second portion, and the third portion may be arranged on the same line.

According to various embodiments, the rotation hole in the blade may include a plurality of protrusions protruding perpendicular to the longitudinal direction of the first blade, a plurality of grooves may be formed in the third portion of the connection member to be disposed in a straight line with respect to the central axis of the connection member, and the grooves may guide fitting of the protrusions.

According to various embodiments, with the coupling between the groove in the connection member and the rotation hole in the blade, in the mounting and dismounting positions, the protrusion of the blade and the groove in the connection member are positioned and fitted to be oriented in the same direction, and at the driving and standby positions of the blade, the protrusion of the blade and the groove in the connection member may be positioned to be oriented in a direction perpendicular to each other with respect to the central axis.

According to various embodiments, each connection member may include a first portion extending from the one surface of the handle structure in the first direction, and a second portion extending from the first portion and including one or more guide grooves. The second portion may include a first guide groove, extending from an upper end and formed in a fourth direction opposite the first direction, a second guide groove, formed along the outer surface of the first connection member in a direction perpendicular to the direction in which the first guide groove is oriented, and a third guide groove extending from the second guide groove and formed in the fourth direction.

According to various embodiments, the rotation hole in the blade may include at least one protrusion protruding perpendicular to the longitudinal direction of the first blade, and the protrusion may be inserted along the first guide groove in the connection member and may be guided along the first guide groove, the second guide groove, and the third guide groove so as to be fastened.

While the disclosure has been shown and described with reference to certain embodiments thereof, it will be apparent to those skilled in the art that the camera lens module according to the disclosure is not limited to these embodiments, and various changes in form and details may be made therein without departing from the spirit and scope of the disclosure as defined by the appended claims.

The invention claimed is:
1. An unmanned aerial vehicle comprising:
a housing;
a wireless communication module located inside or connected to the housing, the wireless communication module being configured to perform wireless communication with an external controller;
a plurality of propulsion systems connected to the housing or at least partially mounted in the housing; and
a navigation circuit configured to control the propulsion systems, at least one of the plurality of propulsion systems including a motor controlled by the navigation circuit and a propeller assembly rotatably connected to the motor, wherein the propeller assembly includes:

a hub structure configured to be rotated by the motor;

a handle structure mounted on a portion of the hub structure, the handle structure including a first connection member, the first connection member including a first post protruding in a first direction perpendicular to a surface of the handle structure and a second post extending parallel to the first post and spaced apart from the first post, the first post and the second post being elastically movable in a second direction perpendicular to the first direction in a state of being fixed to the surface of the handle structure;

a first blade detachably coupled to the first connection member, the first blade including an opening to which the first post and the second post are coupled; and a cap detachably coupled to an upper portion of the first connection member.

2. The unmanned aerial vehicle of claim 1, wherein the first blade has an elongated shape having an axis extending in a third direction perpendicular to the first direction when viewed from above the surface of the handle structure.

3. The unmanned aerial vehicle of claim 2, wherein the third direction is perpendicular to the second direction.

4. The unmanned aerial vehicle of claim 3, wherein the first blade is rotatable relative to the first connection member between a mounting position and a dismounting position, wherein the third direction is perpendicular to the second direction at the mounting position, and wherein the third direction is a same as the second direction at the dismounting position.

5. The unmanned aerial vehicle of claim 1, wherein the propeller assembly further includes:

a second connection member protruding from the surface of the handle structure in the first direction and spaced apart from the first connection member; and a second blade detachably coupled with the second connection member.

6. The unmanned aerial vehicle of claim 5, wherein the propeller assembly further includes:

a third connection member protruding from the surface of the handle structure in the first direction and spaced apart from the first connection member and the second connection member; and a third blade detachably coupled with the third connection member.

7. The unmanned aerial vehicle of claim 3, wherein a slit is formed between the first post and the second post of the first connection member, wherein the slit provides a space in which the first post and the second post are movable in the second direction, and wherein the slit is formed in the third direction parallel to the axial direction of the first blade.

8. The unmanned aerial vehicle of claim 7, wherein the upper end of each of the first post and the second post include a hook protruding outwards with respect to the slit, and wherein the hook is fitted into a fastening hole formed in the cap, and is formed to be oriented in the second direction perpendicular to the third direction.

9. The unmanned aerial vehicle of claim 3, wherein the opening of the first blade includes at least one protrusion that protrudes inwards in a longitudinal direction of the first blade, and the protrusion has a round shape.

10. A propeller assembly included in an unmanned aerial vehicle, the propeller assembly comprising:

a hub structure disposed to surround at least a portion of a motor and configured to rotate depending on operation of the motor;

a handle structure disposed on one surface of the hub structure and including at least one connection member, the at least one connection member including a first post protruding in a first direction perpendicular to a surface of the handle structure and a second post extending parallel to the first post and spaced apart from the first post, the first post and the second post being elastically movable in a second direction perpendicular to the first direction in a state of being fixed to the surface of the handle structure;

at least one blade including a rotation hole detachably coupled to the at least one connection member, the blade being configured to rotate in response to rotation of the handle structure;

an elastic member disposed inside the hub structure and configured to provide an elastic force inside the handle structure; and a cap detachably coupled to an upper end of the at least one connection member.

11. The propeller assembly of claim 10, wherein the handle structure includes:

an opening disposed in a central region through which a shaft of the cap passes; and a plurality of connection members disposed in a straight line on opposite sides with respect to the opening, wherein a diameter of an upper end of each of the connection members is larger than a diameter of another portion of each of the connection members.

12. The propeller assembly of claim 10, wherein, in the cap, the shaft disposed in the central region of the cap is arranged on a same line as a rotation shaft of the motor, and wherein a plurality of fastening holes, which are arranged in a line with respect to each other with the shaft of the cap interposed therebetween, are detachably coupled to a hook disposed at respective upper ends of the connection members.

13. The propeller assembly of claim 10, wherein each of the connection members includes:

a first portion extending from the surface of the handle structure in the first direction;

a second portion extending from the first portion and forming a diameter different from a diameter of the first portion; and a third portion extending from the second portion and including at least one groove, wherein central axes of the first portion, the second portion, and the third portion are arranged on a same line, the rotation hole of the blade includes a plurality of protrusions protruding perpendicular to a longitudinal direction of the first blade, a plurality of grooves are formed in the third portion of the connection member to be disposed in a straight line with respect to the central axis of the connection member, and the grooves guide fitting of the protrusions.

14. The propeller assembly of claim 10, wherein each of the connection members includes:
- a first portion extending from the one surface of the handle structure in the first direction;
- a second portion extending from the first portion and including one or more guide grooves, wherein the second portion includes:
- a first guide groove extending from an upper end, and formed in a fourth direction opposite the first direction;
- a second guide groove formed along an outer surface of the first connection member in a direction perpendicular to a direction in which the first guide groove is oriented; and
- a third guide groove extending from the second guide groove and formed in the fourth direction,
- wherein the rotation hole of the blade includes at least one protrusion protruding perpendicular to a longitudinal direction of the first blade, and the protrusion is inserted along the first guide groove of the connection member and is guided along the first guide groove, the second guide groove, and the third guide groove so as to be fastened.

\* \* \* \* \*